US011265696B2

(12) United States Patent
Zou et al.

(10) Patent No.: US 11,265,696 B2
(45) Date of Patent: Mar. 1, 2022

(54) METHOD OF MOBILITY BASED ON PREDICTION AND PRE-PREPARATION

(71) Applicant: HUAWEI TECHNOLOGIES CO., LTD., Guangdong (CN)

(72) Inventors: Jialin Zou, Randolph, NJ (US); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/111,731

(22) Filed: Dec. 4, 2020

(65) Prior Publication Data

US 2021/0092584 A1    Mar. 25, 2021

Related U.S. Application Data

(63) Continuation of application No. PCT/CN2018/090265, filed on Jun. 7, 2018.

(51) Int. Cl.
*H04W 8/08* (2009.01)
*H04W 4/029* (2018.01)
*H04W 74/08* (2009.01)

(52) U.S. Cl.
CPC ............. *H04W 8/08* (2013.01); *H04W 4/029* (2018.02); *H04W 74/0833* (2013.01)

(58) Field of Classification Search
CPC ....... H04W 4/029; H04W 4/02; H04W 4/023; H04W 8/08; H04W 74/08; H04W 28/0942; H04W 36/245; H04W 74/0833; H04W 28/0226; H04W 4/50; H04W 4/024; H04W 4/021; H04W 8/18; H04W 64/00;

(Continued)

(56) References Cited

U.S. PATENT DOCUMENTS 5,953,667 A * 9/1999 Kauppi ..................... 455/440
6,385,454 B1 * 5/2002 Bahl et al. ................ 455/450
(Continued)

FOREIGN PATENT DOCUMENTS

CN    101365242 A    2/2009
CN    104838708 A    8/2015
(Continued)

OTHER PUBLICATIONS

Akoush et al., "Bayesian Learning of Neural Networks for Mobile User Position Prediction," 2007 16th International Conference on Computer Communications and Networks, Aug. 2007, 6 pages.

(Continued)

*Primary Examiner* — Meless N Zewdu
(74) *Attorney, Agent, or Firm* — Fish & Richardson P.C.

(57) ABSTRACT

Example methods for communicating based on route prediction and pre-preparation in a wireless network are provided. One example method includes determining, by a network entity, a predicted time of entering and a predicted duration of stay of a user equipment (UE) in each cell of a plurality of cells according to a predicted route of the UE, the predicted route including predicted UE locations at corresponding predicted times. The network entity can then determine mobility prediction information according to the predicted time of entering and the predicted duration of stay of the UE in each cell of the plurality of cells. The network entity can then transmit the mobility prediction information to the UE.

20 Claims, 7 Drawing Sheets

(58) Field of Classification Search
CPC ....... H04W 8/20; H04W 28/26; H04W 36/00; H04W 36/32; H04W 36/36; H04W 48/18; H04W 48/20; H04W 56/0095; H04W 72/00; H04W 72/04; H04W 74/00; H04W 74/002; H04W 74/004; H04W 74/006; H04W 74/008; H04W 76/00; H04W 76/10; H04W 76/11; H04W 76/14; H04W 76/34; H04W 88/00; H04W 88/02; H04W 88/08; H04W 40/18; H04W 40/20
IPC .......................... H04W 4/02,4/023, 8/08, 74/08
See application file for complete search history.

(56) References Cited

U.S. PATENT DOCUMENTS

| | | | |
|---|---|---|---|
| 2004/0192341 A1* | 9/2004 | Wang et al. | 455/456.1 |
| 2007/0248032 A1* | 10/2007 | Yasudevan et al. | 370/315 |
| 2007/0249329 A1* | 10/2007 | Zou | 455/414.2 |
| 2008/0170543 A1* | 7/2008 | Rossetti et al. | 370/329 |
| 2012/0135734 A1* | 5/2012 | Ma et al. | 455/436 |
| 2012/0276946 A1* | 11/2012 | Sung et al. | 455/525 |
| 2015/0111581 A1* | 4/2015 | Yiu et al. | H04W 36/0061 |
| 2015/0163639 A1* | 6/2015 | Kilpatrick, II et al. | H04W 4/028 |
| 2015/0208301 A1* | 7/2015 | Ueda | H04W 36/04 |
| 2016/0219409 A1* | 7/2016 | Cai et al. | H04W 4/028 |
| 2016/0366623 A1 | 12/2016 | Senarath et al. | |
| 2017/0086049 A1 | 3/2017 | Vrzic | |
| 2019/0373442 A1* | 12/2019 | Kim | H04W 8/08 |

FOREIGN PATENT DOCUMENTS

| | | |
|---|---|---|
| CN | 105009475 A | 10/2015 |
| CN | 105532056 A | 4/2016 |
| CN | 106658581 A | 5/2017 |
| CN | 106664525 A | 5/2017 |
| CN | 107295543 A | 10/2017 |
| WO | 2017173037 A1 | 10/2017 |
| WO | 2018064279 A1 | 4/2018 |

OTHER PUBLICATIONS

Extended European Search Report issued in European Application No. 18921751.6 dated May 26, 2021, 10 pages.

Office Action issued in Chinese Application No. 201880094383.X dated May 31, 2021, 12 pages.

3GPP TS 38.331 V15.1.0 (Mar. 2018), "3rd Generation Partnership Project; Technical Specification Group Radio Access Network; NR; Radio Resource Control (RRC) protocol specification (Release 15)," Mar. 2018, 268 pages.

PCT International Search Report and Written Opinion issued in International Application No. PCT/CN2018/090265 dated Mar. 6, 2019, 12 pages.

* cited by examiner

METHOD OF MOBILITY BASED ON PREDICTION AND PRE-PREPARATION

CROSS-REFERENCE TO RELATED APPLICATIONS

This application is a continuation of International Application No. PCT/CN2018/09265, filed on Jun. 7, 2018, the disclosure of which is hereby incorporated by reference in its entirety.

TECHNICAL FIELD

The present invention relates generally to a system and method for user equipment (UE) mobility in a wireless network, and, in particular embodiments, to a system and method for UE mobility based on UE location prediction and pre-preparation of the UE and network components.

BACKGROUND

Generally, conventional wireless systems have limited UE mobility information. In most cases, actions will be taken after the network figures out which cell/TRP/beam the UE is at via signal exchanges and measurement (e.g. paging and access). A lot of signaling overhead and delay are introduced by the conventional method.

SUMMARY

In accordance with an embodiment of the present disclosure, a method for resource allocation in a wireless network includes obtaining, at a network entity, a predicted route for a user equipment (UE). The method also includes determining, by the network entity, a predicted time of entering and a predicted duration of stay of the UE in each of a plurality of cells. Each of the plurality of cells includes the finer coverage of local transmission reception point (TRP)(s) and/or beams. In this disclosure, the terms TRP(s) and beam(s) are used to represent the coverage of the TRP(s) or beam(s) without any difference. The method also includes determining, by the network entity, mobility prediction information according to the predicted time of entering and the duration of stay of the UE in each of the plurality of cells, each of the coverage of the TRPs and the beams in the cell (TRPs and beams in the cell). The method also includes transmitting, by the network entity, the mobility prediction information to the UE.

In accordance with an embodiment of the present disclosure, a network entity includes a non-transitory memory storage including instructions; and one or more processors in communication with the non-transitory memory storage. The one or more processors execute the instructions for obtaining, at the network entity, a predicted route for a user equipment (UE). The one or more processors also execute the instructions for determining, by the network entity, a predicted time of entering and a predicted duration of stay of the UE in each of a plurality of cells. Each of the plurality of cells includes a base station (gNB in 5G) with antenna arrays and generating multiple beams together with local TRPs to cover the entire cell. The one or more processors also execute the instructions for determining, by the network entity, mobility prediction information according to the predicted time of entering and the duration of stay of the UE in each of the plurality of cells, and the TRPs and beams in the cell. The one or more processors execute the instructions for transmitting, by the network entity, the mobility prediction information to the UE.

In accordance with an embodiment of the present disclosure, a network entity includes a receiver configured to obtain a predicted route for a user equipment (UE). The network entity also includes a predictor configured to determine a predicted time of entering and a predicted duration of stay of the UE in each of a plurality of cells. Each of the plurality of cells includes a base station with antenna arrays and generating multiple beams together with local TRPs to cover the entire cell coverage. The network component also includes a mobility prediction information generator configured to determine mobility prediction information according to the predicted time of entering and the duration of stay of the UE in each of the plurality of cells. TRPs, and beams in the cell. The network component also includes a transmitter configured to transmit the mobility prediction information to the UE.

In an embodiment, a method in a user equipment (UE) for communicating in a network includes receiving, at the UE, a mobility prediction information. The mobility prediction information includes a predicted time of entering each of a plurality of cells for the UE, a predicted duration of stay within each of the plurality of cells for the UE, and at least one configuration associated with at least one cell, transmit receive point (TRP), or beam in the plurality of cells for the UE. The predicted time of entering, the predicted duration of stay, and the configuration determined according to a predicted route of the UE. The predicted route includes predicted UE locations at corresponding predicted times. The method also includes configuring, by the UE, UE components to communicate with one of the plurality of cells at the predicted time of entering the one of the plurality of cells according to the mobility prediction information.

In an aspect, the method also includes reporting, by the UE, a time and location update when the a predicted time and location pair for the one of the cell, TRP, or beam differs from an actual time and location pair of the one of the cell, TRP, or beam is greater than a threshold, wherein the predicted time and location pair determined according to the mobility prediction information message.

In an embodiment, a method in a user equipment (UE) for communicating in a network includes receiving, at the UE, a schedule of cell reselection for the UE in inactive mode and idle mode. The schedule of cell reselection includes a time of cell reselection and a cell identifier for each of a plurality of cells along a predicted route of the UE. The information can be used to compare with the real reselection time, if the offset is greater than a threshold, the UE will report to the network. The network dynamically adjust the schedule prediction. According to the received schedule, the UE applies the pre-received cell specific configuration parameters (e.g. the SSB and CSI-RS associated access or uplink transmission resources, and the TAs associated with each beam on the route in the cell) and take any pre-scheduled action accordingly, and to be prepared and ready for direct data transmission and receiving. The schedule of cell reselection is determined according to mobility prediction information. The method also includes attaching, by the UE, to a first cell from the plurality of cells at a time determined according to the schedule. The method also includes disconnecting, by the UE, from a second cell from the plurality of cells at the time determined according to the schedule. A timer is maintained in the UE to provide the timing of triggering the events following the received network predicted schedule.

In an embodiment, a user equipment (UE) includes a non-transitory memory storage comprising instructions and one or more processors in communication with the non-transitory memory storage, wherein the one or more processors execute the instructions. The instructions include instructions for receiving, at the UE, a schedule of cell reselection for the UE. The schedule of cell reselection includes a time of cell reselection and a cell identifier for each of a plurality of cells along a predicted route of the UE. The schedule of cell reselection is determined according to mobility prediction information. The instructions also include instructions for connecting, by the UE, to a first cell from the plurality of cells at a time determined according to the schedule. The instructions also include instructions for disconnecting, by the UE, from a second cell from the plurality of cells at the time determined according to the schedule. Some benefits for a UE to conduct the scheduled configuration include:

1. For a UE in connected mode, handover pre-preparation and RACH less access for the next target cell is allowed to minimize the handover latency on the mobility critical path and meet URLLC requirement during the mobility.
2. For a UE in inactive mode, the UE is allowed to use the pre-configured beam associated (associated with SSB or CSI-RS) UL resources according to the schedule triggered by a UE local timer to conduct access or RACH less access and direct data transmission without the need to check which cell/TRP/beam currently the UE is under.

In an embodiment, a method in a user equipment (UE) for communicating in a network includes receiving, at the UE, a mobility prediction information message. The mobility prediction information message includes a time of entering, a duration of stay within at least one cell, transmit receipt point (TRP), or beam, and at least one configuration associated with the at least one cell, TRP, or beam. The method also includes reporting, by the UE, a time and location update when the a predicted time and location pair for the one of the cell, TRP, or beam differs from an actual time and location pair of the one of the cell, TRP, or beam is greater than a threshold. The predicted time and location pair determined according to the mobility prediction information message.

In an embodiment, a user equipment (UE) includes a non-transitory memory storage comprising instructions; and a route timer which is synchronized with the same one maintained at the network to trigger the scheduled events including applying corresponding configuration parameters at the right time and starting scheduled activities. The UE also includes one or more processors in communication with the non-transitory memory storage, wherein the one or more processors execute the instructions. The instructions include instructions for receiving a mobility prediction information message. The mobility prediction information message includes a time of entering, a duration of stay within at least one cell, transmit receipt point (TRP), or beam, and at least one configuration associated with the at least one cell, TRP, or beam. The instructions also include instructions for reporting a time and location update when the a predicted time and location pair for the one of the cell, TRP, or beam differs from an actual time and location pair of the one of the cell, TRP, or beam is greater than a threshold. The predicted time and location pair determined according to the mobility prediction information message.

In an embodiment, a network entity includes a first determining module configured to determine a predicted time of entering and a predicted duration of stay of a user equipment (UE) in each of a plurality of cells according to a predicted route of the UE. The predicted route includes predicted UE locations at corresponding predicted times. The network entity also includes a second determining module configured to determine mobility prediction information according to the predicted time of entering and the duration of stay of the UE in each of the plurality of cells. The network entity also includes a transmitter configured to transmit the mobility prediction information to the UE.

In an aspect, the first and second determining module can implemented by a processor.

In an embodiment, an apparatus includes a receiver configured to receive mobility prediction information. The mobility prediction information includes a predicted time of entering each of a plurality of cells for the apparatus, a predicted duration of stay within each of the plurality of cells for the apparatus, and at least one configuration associated with at least one cell, transmit receive point (TRP), or beam in the plurality of cells for the apparatus. The predicted time of entering, the predicted duration of stay, and the configuration are determined according to a predicted route of the apparatus. The predicted route includes predicted apparatus locations at corresponding predicted times. The apparatus also includes a parameter configuration module configured to set parameters in apparatus components to facilitate communication with one of the plurality of cells at the predicted time of entering the one of the plurality of cells according to the mobility prediction information.

In an aspect, the parameter configuration module can implemented by a processor.

Optionally, in any of the preceding aspects, the determining a predicted time of entering and a predicted duration of stay includes determining a first predicted time of entering of a first cell in the plurality of cells and determining a delta time of entering for the remainder of the plurality of cells, wherein the delta time of entering comprises a time difference with respect to the first predicted time of entering or a time difference with respect to a time of entering of a previous cell. The entering of the current cell is the existing of the previous cell.

Optionally, in any of the preceding aspects, the method further includes determining a time of entering of each of a plurality of TRPs in each of the plurality of cells.

Optionally, in any of the preceding aspects, the method further includes determining a time of entering of each of a plurality of beams in each of the plurality of cells.

Optionally, in any of the preceding aspects, the mobility prediction information includes a time of cell reselection.

Optionally, in any of the preceding aspects, the mobility prediction information includes the predicted duration of stay of the UE in each of the plurality of cells.

Optionally, in any of the preceding aspects, the mobility prediction information includes the predicted duration of stay of the UE in each of the plurality of TRPs in each of the plurality of cells.

Optionally, in any of the preceding aspects, the mobility prediction information includes the predicted duration of stay of the UE in each of the plurality of beams in each of the plurality of cells.

Optionally, in any of the preceding aspects, the mobility prediction information includes at least one of a cell identification of each of the plurality of cells, an SSB_ID of each of the plurality of wide beams of cells or TRPs, or a CSI-RS ID of each of the beams in each of the plurality of cells.

Optionally, in any of the preceding aspects, the mobility prediction information includes at least one of cell, TRP, and beam specific parameters corresponding to the cell, TRP, and beam at the associated time duration.

Optionally, in any of the preceding aspects, the mobility prediction information includes actions scheduled to take at each of the cells, TRPs, and/or beams on the predicted route and at the predicted time duration. All above cells/TRPs/beams entering time and the time duration of stay included in the mobility prediction information message and delivered to the UE allows the UE to compare the predicted time and actual time at the current cell/TRP/beam coverage. The metrics for the offset can be other than the time difference (e.g. number of the beams from the predicted beam coverage, distance from the predicted location at this moment). If the difference is larger than a threshold, the UE report to the network and the network adjust the prediction. The UE notification to the network can be pre-defined signal pattern or uplink message. This forms a closed tracking loop to ensure the accuracy of the prediction.

Optionally, in any of the preceding aspects, the mobility prediction information includes cell, TRP, or beam associated parameters or information. One example is the beam associated Uplink access or direct transmission resource. This information allows an inactive UE to conduct access or direct data transmission using the Uplink resources which are configured according to the schedule based on the UE's local timer. To compensate the inaccuracy of the time-beam estimation, the UE can perform the Uplink transmission on the Uplink resources associated with multiple beams including the target beam and a few of its closest neighboring beams. This allows the inactive UE to conduct low latency access and direct data transmission and avoid the convention resume procedures before the data transmission. Another example of the information is the cell/TRP/beam associated Downlink monitoring occasions or opportunities. According to the scheduled pre-configuration, the inactive UE can monitor the paging occasions or direct data TX opportunities corresponding to the Cell/TRP/beam(s) on the route at current time.

Optionally, in any of the preceding aspects, the cell and TRP or beam associated parameters or information includes a default timing advance associated with each TRP or beam. This allows a UE using the right TA at the corresponding beam (location) to conduct RACH less access in normal mobility scenarios. This is impossible with conventional method.

Optionally, in any of the preceding aspects, the TRP or beam associated parameters or information includes control information to enable or disable a specified function at a corresponding cell, TRP, or beam at a specified time according to the predicted route. This allows the inactive UE change its behavior according to a pre-assigned schedule without the need that network to page the UE to wake it up first and then send the reconfigure message to the UE to change its behavior (e.g. change from the inactive to connected mode). This will significantly reduce the delay of the action and the signaling overhead. For example, during the period that the UE passing through certain commercial area, the UE can stop to receive the direct data transmission to the UE. Another example is the UE can change from inactive mode to the connected mode and vice versa according to the schedule.

Optionally, in any of the preceding aspects, the method further includes transmitting, by the network entity, scheduled reservations and scheduled actions to the gNBs on the predicted route, the scheduled reservations and scheduled actions determined according to the predicted time of entering and the predicted duration of stay of the UE in each of a plurality of cells on the predicted route.

Optionally, in any of the preceding aspects, the method further includes receiving, by the network entity, a location updated message or a location updated signal from the UE, when the UE determines that an actual location of the UE differs from a predicted location of the UE by a threshold value. The method also includes transmitting, by the network entity, updated mobility prediction information to the UE, the updated mobility prediction information determined according to the location updated message or the location updated signal.

Optionally, in any of the preceding aspects, the method further includes receiving, by the network entity, UE feedback. The method also includes determining, by the network entity, that an actual location of the UE differs from a predicted location by more than a threshold value determined according to the UE feedback. The method also includes transmitting, by the network entity, updated mobility prediction information to the UE, the updated mobility prediction information. The preceding aspects allow a much more accurate estimation or prediction of the time and location of the UE. It will significantly reduce the load of paging and Downlink direct data transmission.

Optionally, in any of the preceding aspects, the method further includes transmitting, by the network entity, updated scheduled reservations and updated scheduled actions, or reservation cancellations to the gNBs on an updated predicted route, or not on the updated route but one the previously predicted route, the updated scheduled reservations, the updated scheduled actions, and the updated predicted route determined according to the location updated message, the location updated signal, or the UE feedback. This will allow the network resource saving while support the direct data transmission. For example, to support direct data transmission for both DL & UL, the context of the inactive UE will only be transferred to the cell and maintained there during the time the UE staying in the cell's coverage. After the UE left the cell, the context of the UE is released.

Optionally, in any of the preceding aspects, the method further includes assigning, by the network entity, a global cell-radio network temporary Identifier (C-RNTI) to the UE. The method also includes transmitting, by the network entity, a UE C-RNTI schedule of when the global C-RNTI is reserved to the UE in a specified cell to the gNB of the specified cell. The global C-RNTI is reused for a different UE in the specified cell outside the UE C-RNTI schedule.

Optionally, in any of the preceding aspects, the method further includes transferring, by the network entity, the context of the UE to the gNB of the specified cell following the same schedule of the C-RNTI reservation. The UE's context is released at the same time when the C-RNTI is released at the specified cell.

Optionally, in any of the preceding aspects, a network entity includes an assigner configured to assign a global cell-radio network temporary identifier (C-RNTI) to the UE, and wherein the transmitter is further configured to transmit a UE C-RNTI schedule of when the global C-RNTI is reserved to the UE in a specified cell to a gNB for the specified cell, wherein the global C-RNTI is reused for a different UE in the specified cell outside the UE C-RNTI schedule. The preceding aspects allow the UE using the same C-RNTI across different cells on its pre-determined route. The need of updating C-RNTI whenever entering a new cell is eliminated. C-RNTI is critical for UE to conduct PDCCH decoding and perform reference signal de-scrambling.

Optionally, in any of the preceding aspects, the network entity includes one of a network controller or one of the gNBs.

Optionally, in any of the preceding aspects, the method includes transmitting, by the UE, one of a location updated message and a location updated signal to a network entity when an actual location of the UE differs from a predicted location of the UE by a threshold value. The method also includes receiving, by the UE, an updated schedule of cell reselection, the updated schedule of cell reselection determined according to one of the location updated message and the location updated signal.

Optionally, a UE can use the pre-configured Uplink resources associated with a beam coverage that the UE is passing through following the schedule to perform the access or Uplink direct data transmission.

Optionally, a UE can use the pre-configured TA associated with the beam that the UE is passing through following the schedule to conduct RACH less access.

Optionally, an inactive UE can use the pre-scheduled configuration on Downlink monitoring direct data transmission opportunities and the paging occasions to monitor the direct data transmission and page message to the UE.

Optionally, in one or more of the preceding aspects, the configuration includes beam associated uplink (UL) transmission (TX) resources including UL random access occasions and direct data TX opportunities, UL timing advance (TA) for UL transmission, downlink (DL) paging occasions, and DL direct data monitoring opportunities.

Optionally, in one or more of the preceding aspects, the method also includes receiving, an updated mobility prediction information message.

Optionally, in one or more of the preceding aspects, the method also includes conducting UL access or direct data transmission with pre-configured uplink (UL) transmission (TX) resources in effect at current time duration according to the schedule in the mobility prediction information message.

Optionally, in one or more of the preceding aspects, the method also includes performing RACH less access and direct data transmission (TX) with pre-determined and scheduled TA corresponding to current time.

Optionally, in one or more of the preceding aspects, the method also includes monitoring, by the UE, opportunities to receive paging messages or DL direct TX data according to a scheduled pre-configuration of paging or direct TX opportunities determined according to the mobility prediction information message.

Optionally, in one or more of the preceding aspects, the method also includes changing, by the UE, UE behavior according to pre-configured scheduled instructions embedded in the mobility prediction information message.

Optionally, in one or more of the preceding aspects, the UE maintains the same C-RNTI on a pre-scheduled route across different cells on the pre-scheduled route.

Optionally, in one or more of the preceding aspects, the mobility prediction information comprises at least one of the following: a cell identification of each of the plurality of cells, an SSB_ID of each of the plurality of cells or TRPs, and a CSI-RS ID of each of the beams in each of the plurality of cells.

Optionally, in one or more of the preceding aspects, the mobility prediction information comprises at least one of cell, TRP, and beam specific parameters.

Optionally, in one or more of the preceding aspects, the method also includes using the pre-configured Uplink resources associated with a beam coverage that the UE is passing through following the schedule to perform the access or Uplink direct data transmission.

Optionally, in one or more of the preceding aspects, the method also includes using the pre-configured TA associated with the coverage of the beam or the TRP at the time that the UE is passing through following the schedule to conduct RACH less access.

Optionally, in one or more of the preceding aspects, an inactive UE uses the pre-scheduled configuration on Downlink monitoring direct data transmission opportunities and the paging occasions to monitor the direct data transmission and page message to the UE.

In an embodiment, a network entity includes a non-transitory memory storage comprising instructions. The network entity also includes one or more processors in communication with the non-transitory memory storage. The one or more processors execute instructions for implementing any of the previous disclosed methods, embodiments, or aspects.

In an embodiment, an apparatus includes a non-transitory memory storage comprising instructions and a route timer which is synchronized with the same one maintained at the network to trigger the scheduled events including applying corresponding configuration parameters at the right time and starting scheduled activities. The apparatus also includes one or more processors in communication with the non-transitory memory storage. The one or more processors execute instructions for implementing any of the preceding methods, embodiments, or aspects.

In one or more disclosed embodiments, the network provided mobility prediction information allows both the UE and network to conduct pre-preparation for UE mobility. This can lead to significant signaling overhead reduction, delay reduction, and provide for resource sharing.

DETAILED DESCRIPTION OF ILLUSTRATIVE EMBODIMENTS

Figure 1:
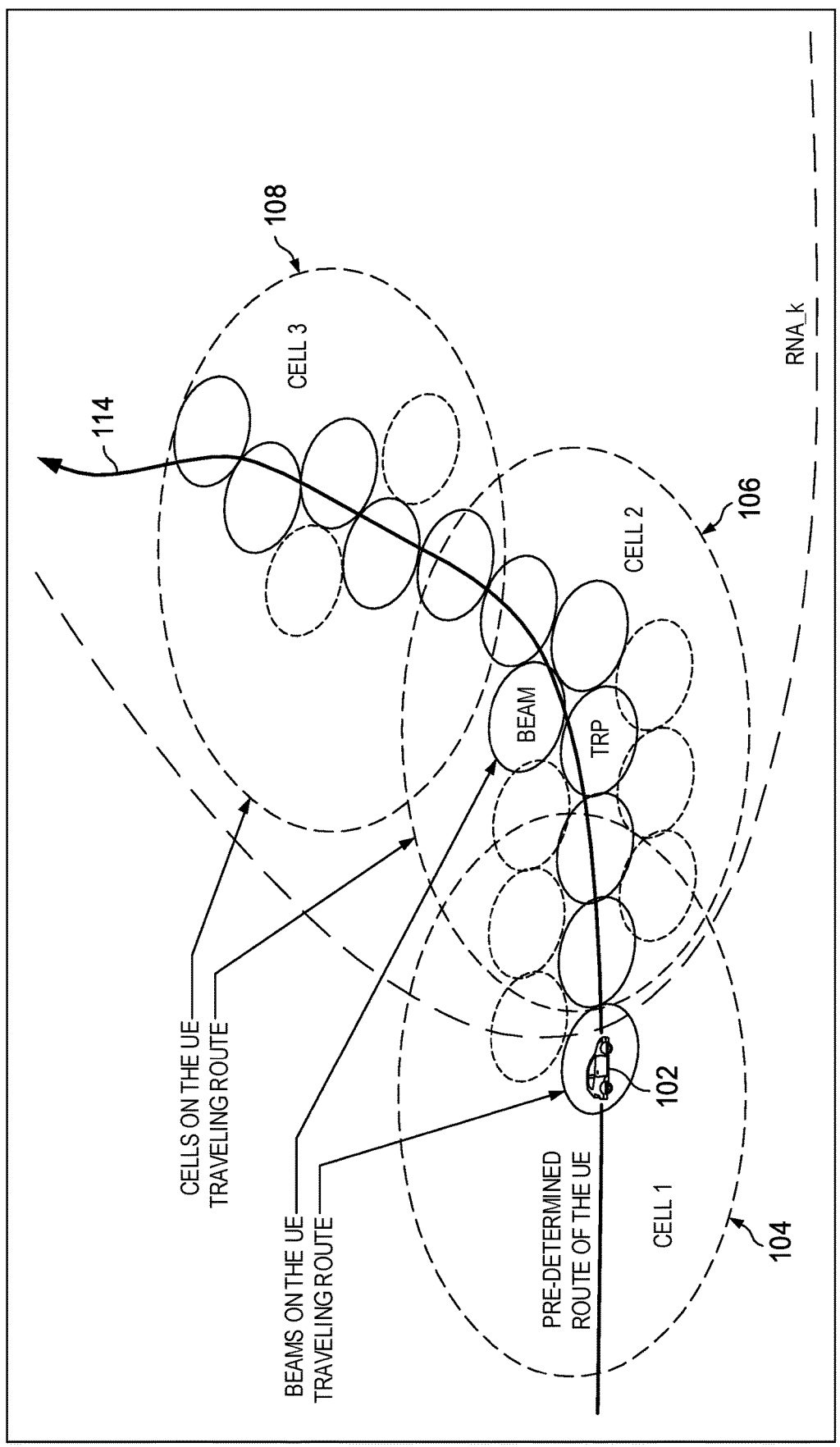
FIG. 1 is a diagram of an embodiment of a system for pre-preparation of the UE and cells, TRPs, and beams for a pre-determined route of the UE.

The structure, manufacture and use of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

One or more embodiments of this disclosure relate to 5G enhanced mobile broadband (eMBB) and ultra-reliable low latency communications (URLLC) topics of mobility enhancement based on predication and pre-preparation for user equipment (UEs) in a radio resource control (RRC) connected state or an RRC inactive state. One or more embodiment systems, methods, and devices of this disclosure take the advantage of future intelligence network and support the self-moving intelligent machines.

Backed by the route prediction capability of the intelligent network, significant reduction on signaling overhead and delay, more efficient resource reuse can be achieved comparing with a conventional system. Aspects of the present disclosure take advantage of the nature of a class of intelligent moving machines whose traveling routes are pre-programed or whose route can be predicted based on a mapping application, past habits, or other means.

The capabilities in an intelligent network support very accurate UE mobility prediction. That is, the location of UE at any given time may be predicted down to, in some cases, beam coverage level accuracy. A beam refers to directional signal transmission and/or reception. This accuracy in UE mobility prediction is due to several different factors. The travel routes for self-driving vehicles, self-moving robots/ intelligent devices are pre-programed, therefore their location at any given time is known to the network to a precise degree of accuracy. In many cases the network knows the UE travel route. For other devices, there are other mechanisms to accurately predict the location of the UE at any given time. If a user knows the route, then it is likely that the route falls into the user's travel pattern Thus, the intelligent network may be able to predict the devices location at any time fairly accurately based on the habits of the user. For example, the user's commute to and from work may be observed and determined over time by the intelligent network, thereby allowing the network to predict the travel route and schedule accurately. If the route is not well known by the user, the user will likely use a map application to generate the deterministic travel route. These mapping applications can fairly accurately predict the time of arrival at the destination after the traveling route is determined. This information can be transmitted to the network. In addition to these methods, the network has other methods to estimate the UE speed and UE location. For example, the UE speed and location is mostly driven by the type of traveling (walk, bicycle, drive) and road traffic conditions in an Urban area. An intelligent network has much better knowledge on the overall situation. The network can account for traffic congestion and predict that the UE will stay on a road, sidewalk, or bike lane depending on the type of travel. The update to the network on initial location of the UE and the type of movement can aid the network in determining the whether the user is walking, biking, or driving. Once determined, the network can predict that the user will continue using this form of transportation. For rural area traveling, vehicles mostly follow the posted speed limit (at least within a reasonably narrow band of speeds centered around the speed limit) on the highway or local road.

By obtaining a predicted route of a device, the network can use this information to pre-prepare the UE and the cells along the route with information necessary for the UE to communicate with and connect with the network. This pre-preparation information can inform the cells along the route when the device will be within their coverage area and when to expect a handoff from a previous cell as well as when to expect to handoff the device to a cell as the device leaves the coverage area of the cell. The device can also be provided with a list of cell identifiers, beam identifiers, and the like as well as times when the device will be communicating with specific cells or beams.

Through a message, such as, for example, an RRC message, a network provides a UE the predicted mobility information of the UE, which in some embodiments, contains a list of the IDs of the cells/TRPs/beams on the predetermined route of the UE; a time of entering and time of stay corresponding to the cells/TRPs/beams on the predetermined route; and scheduled parameters to apply and actions to take at the corresponding cells/TRPs/beams and the corresponding time. There can be large amount of information transmitted to the UE. In an aspect, RRC layer information can be provided by an RRC message. In an aspect, the network: can access the data not only from the radio network but also from other domain (e.g. route transportation traffic data). In an aspect, the network can provide the prediction on not only the location of a mobile device but also the time schedule. In another aspect, as an example, the default timing advance associated with each TRP and beam can be included in the predicted mobility information message. The UE can use the default timing advance at the scheduled time which will corresponding to the right TRP or beam.

Embodiments of the present disclosure provide closed loop prediction adjustment with UE feedback for accurate prediction of an inactive UE's location. In an aspect, the UE based on its measurement of the beam determines whether current cell/beam is as the network predicted. If not, the UE sends a location update message or signal to the network. The network will send update mobility prediction information to the UE.

In embodiments of the present disclosure, in addition to sending mobility prediction information to the UE, the network also informs nodes on the predicted route of the scheduled reservation and actions. The next generation (NG) cloud sends the schedule message to the nodes which can have an impact to the interface(s) of the network elements. In an aspect, the NG cloud includes the RAN cloud and the core cloud. As used herein, the terms TRP(s) and beam(s) are used to represent the coverage of the TRP(s) or beam(s) without any difference. In another aspect, as an example, global C-RNTI can be achieved bile allowing local C-RNTI sharing by scheduled reservation at the corresponding cells on the pre-determined route. The UE's context can be transferred to the right cell based on the same schedule for C-RNTI reservation to save the network resource.

This pre-preparation can cut down on signaling overhead by reducing the information that needs to be exchanged between the UE and the network, especially during handover stages when the device may not have a good connection with one or other cells involved in the handover. The pre-preparation can also result in delay reduction as well as provide for resource sharing. These and other advantages are provided by one or more aspects of the present disclosure. As used herein, the UE can refer to traditional UEs (e.g., smart phones, etc.), but the UE can also refer to self-moving intelligent devices such as autonomous robots, etc.

FIG. 1 is a diagram of an embodiment of a system 100 for pre-preparation of the UE and cells for a pre-determined route of the UE. The system 100 includes a UE 102 and a plurality of cells 104, 106, 108. Each cell includes a plurality of beams 110, 112. The network has obtained a pre-determined route 114 of the UE 102. The system 100 includes beams 110 and local TRPs that are on the UE's pre-determined route 114 as well as beams 112 and TRPs that are not on the UE's pre-determined route 114. The system 100 shows that after the travel route 114 is decided for a UE (this can be initially reported by the device or determined in another way), the network determines the cells 102, 106, 108 and TRPs/beams 110 on the route and estimates the time and duration the UE 102 enters and stays within each particular cells 102, 106, 108 and TRPs/beams 110 coverage.

Backed by the prediction capability of the intelligent network, significant improvement can be achieved as compared with a conventional system.

For an RRC-connected UE 102, a number of pre-preparation activities can be performed that will reduce signaling overhead, reduce delay, and provide for resource sharing. In an aspect, the network can pre-prepare the Dual Connectivity (DC) based Handover (HO) target cell 104, 106, 108 before the target cell measurement is available. This meets the requirements of 0 millisecond (ms) interruption and URLLC during the HO. In another aspect, the network pre-transfers the UE's context according to the schedule of the UE's visiting of the target cell(s) 104, 106, 108 to facilitate radio link failure re-establishment. This provides a more efficient method of HO with better performance and resource saving over prior art methods of HO. Additionally, the pre-preparation of the target cell(s) 104, 106, 108 allows "global" cell-Radio network temporary identifier (C-RNTI) sharing if needed. Pre-scheduled C-RNTI reservation to the cells 104, 106, 108 covering the predetermined traveling route 114 with expected time of entering and duration of stay within each cell 104, 106, 108 on the pre-determined traveling route 114.

For RRC-Inactive UEs, in an aspect, the disclosed systems and methods for pre-preparation of UEs and the network based on a predicted route support the direct data transfer for self moving devices with time sensitive instruction/control information. Aspects allow low latency instructions for delay sensitive applications, significantly reduce the paging load, and allow random-access channel (RACH) less access. Allowing RACH less access minimizes the uplink (UL) delay and saves power. In an aspect, the network pre-transfers the UE's context before the schedule time of the UE's reselecting of the target cell(s). Pre-preparation allows the "global" UE identifier, such as I-RNTI/UE ID for the inactive UEs and C-RNTI for the RRC connected UEs, usage and sharing in a cell, if needed. The I-RNTI is the unique ID of a RRC inactive UE within a RAN notification area (RNA). When an inactive UE resumes to the RRC connected state, the UE notifies the current serving cell with the I-RNTI. The network uses this I-RNTI (the unique UE ID) to find and fetch the UE's context to the serving cell. Pre-scheduled I-RNTI/UE ID reservation to the cells covering the predetermined route, with expected time and duration. Once the first UE using the I-RNTI/UE ID or the C-RNTI has left the cell, the I-RNTI/UE ID or the C-RNTI assigned to the first UE can be reused by the cell and assigned to a different UE in the cell while the first UE continues to use the I-RNTI/UE ID or C-RNTI in a different cell. Pre-preparation also allows the UE location tracking at the TRP/beam resolution. In an aspect, the network pre-assigns multiple security keys with associated use-time schedule—allowing scheduled key changes at both the network and UEs at the same time. In an aspect, to ensure the accuracy of the mobility prediction especially for inactive UEs, it is desirable to have closed loop tracking mechanism with UE feedbacks.

The network can predict the time of visit of the cells/TRPs/beams on the UE's traveling route, then provide the mobility prediction information message to the UE which contains the list of the cells/TRPs/beams to be visited and the prediction of visit time of the cell/TRP/beam overages. The inactive UE can compare the predicted visit time with real time of visit a specific cell/TRP/beam coverage. The UE will send out a location update signal/message if it finds that the difference between the predicted location and the real (actual) location is larger than a threshold value. For example, in an aspect, if the predicted location at a specific time differs from the actual location of the UE at that specific time by more than 1000 meters, the UE will send out a location update signal/message to the network. A closed tracking loop is formed to ensure the accuracy of the mobility prediction by the network at the cell level resolution or beam level resolution based on predication accuracy. The mobility prediction information message also contains the scheduled actions and parameters to apply at the corresponding cell/TRP/beam to the UE. The UE can take action at the right time and cell/TRP/beam location. The network will also notify the network nodes along the route to schedule the resource reservation and action at nodes corresponding to the UE's visit.

There are several beneficial aspects of the present disclosure. In one aspect, the network provides the UE with the predicted mobility information. The UE, based on the predicted mobility information, is scheduled to and perform its activities at the corresponding coverage and times indicated by the predicted mobility information. Following the mobility prediction information, at the moment when the transmitting and receiving events occur, the inactive UE can, based on the current time, determine the right beam or TRP and use the right/associated configuration parameters to take action without the pre-measurement.

Figure 2:
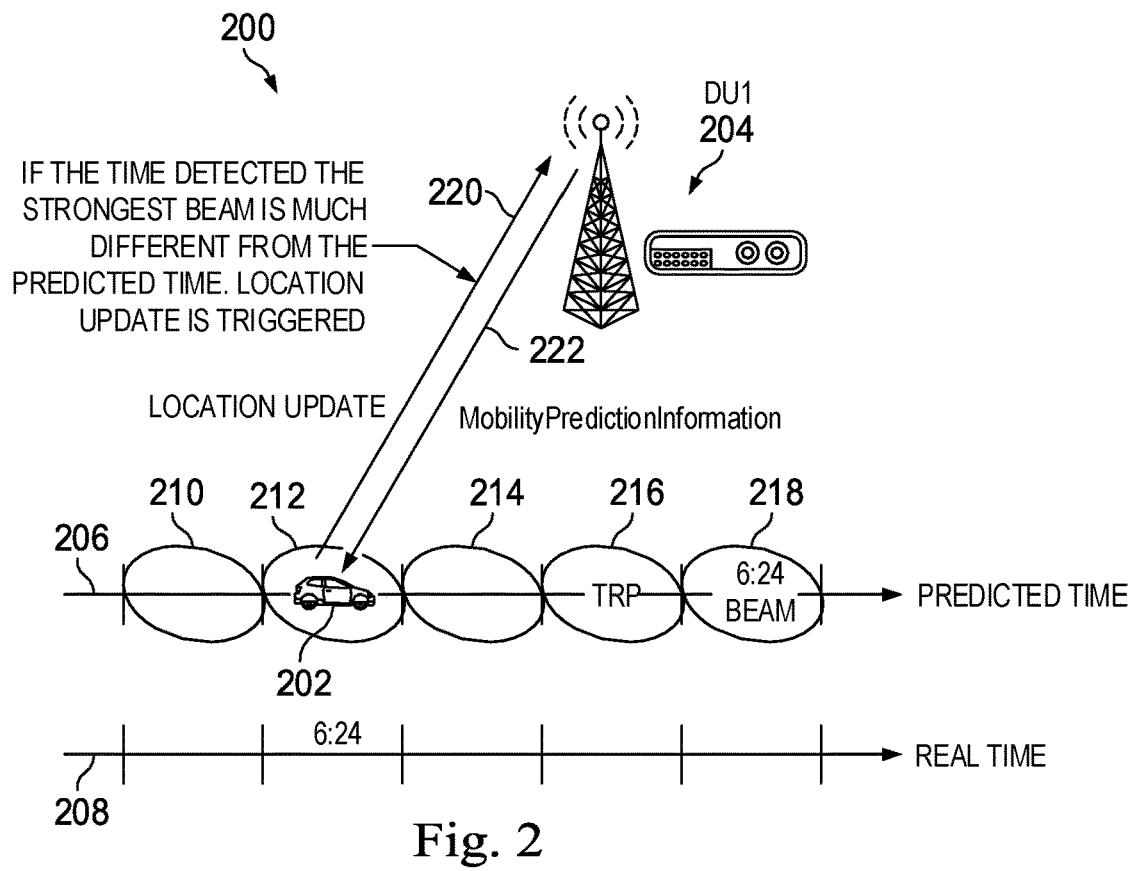
FIG. 2 is a diagram of an embodiment of a system for closed loop inactive UE location tracking.

In another aspect, the inactive UE compare its current location with the predicted location at this time. If the offset of the UEs location as compared to a predicted location at that time is more than a threshold, the UE sends out the location update to the network. The network responds accordingly with an updated predicted mobility information. A closed tracking loop is formed to ensure the accuracy of the prediction. In an aspect, the network receives UE feedback and determines whether the UE's location differs from the predicted location by more than a threshold and then, if so, transmits updated predicted mobility information to the UE. The metric for measuring the offset can be number of the beams and/or TRPs. Then the threshold can be set to the tolarable number of beams away between the predicted and actual beam the UE is staying, for example 2 (beams) is set to the threshold as shown in FIG. 2. The metric can be a distance (e.g., miles, feet, kilometers, etc.). The metric can also be time offset to the predicted schedule, then the threshold will be speed dependent. Small value should be configured to the threshold for high speed and large value should be used for low speed.

In another aspect, a next generation (NG) cloud notifies the network nodes involved with the UE route of the scheduled reservation of the resource to be used by the UE at the predicted cell/TRP/beam at the predicted time.

In another aspect, the global C-RNTI can be achieved while local sharing of the C-RNTI is still allowed by pre-reservation based on the predicted mobility information. The UE context can be pre-transferred to the right cell at the same time corresponding to the pre-reserved C-RNTI. The context can stay for the same time period and can be released at the same time as the corresponding C-RNTI.

After the travel route is determined, the network can predict the list of the cells/TRPs/beams on the UE's route, the UE's time of entering each cell/TRP/beam and duration of stay at a cell/TRP/beam coverage area. In an aspect, the network provides the initial entering time of the first cell/first Synchronization Signal Block (SSB)/first Channel state information-reference signal (CSI-RS) corresponding to cell/TRP/beam respectively, then the time duration of stay with each of the Cell/TRP/beam of all the rest on the route and a entry time in each of the subsequent cell/TRP/beam as a reference to a time differential with respect to the time of entry into the first cell/TRP/beam. Cell level location estimation is the easiest, and at CSI-RS beam level resolution is most difficult. The mobility predication information provides not only the space domain information (UE location) but also the time domain information.

The network (e.g., a gNB or a network controller or other network entity or element) pre-assigns and schedules the possible use of the beam/TRP associated information/parameters along the route. Another example of a network element, in action to a gNB and radio network controllers is a mobile cloud engine (MCE) used in CloudRAN in 5G networks. The information will also be carried by mobility prediction information message. The UE can be in connected mode or in an inactive mode. The latter mode may be more likely in certain embodiments. For example, upon received the RAN notification area update (RNAU) message, the network sends the UE a Mobility Prediction Information message which contains the Cell/SSB/CSI-RS ID, the time of reselection, the duration of stay and other cell/TRP/beam related information. In an aspect, the Mobility Prediction Information message carries other TRP/beam associated parameters or information. For example, the Mobility Prediction Information message may contain the default timing advance associated with each TRP/beam. The timing advance (TA) is driven by RTD of a UE at a specific location, i.e. it is location dependent. A default TA of a small TRP/beam coverage can be pre-determined. A fixed default value can be used for the small TRP/beam coverage of a specific location within the tolerance of the cyclic-prefix (CP). The default TA value can be determined first by measurement during initial deployment and then can be adaptively updated/optimized over the time based on long term statistics of the actual offset of the received signals at the UL receivers and the actual TA applied to the UEs. In some aspects, the mobility prediction information message can also carry the control information to enable or disable certain function(s) at the given cell/TRP and given time based on the schedule predicted by the network. In various aspects, the mobility prediction information message can include one, several, or all of the various types of information disclosed as being included in the mobility prediction information message. Some of the information may not be included in some aspects or embodiments. In some aspects, additional information to that disclosed above is included in the mobility prediction information message. Those skilled in the art will recognize that the types and kind of information included in the mobility prediction information message may vary depending on implementation.

Table 1 below is an example of the contents of an embodiment of a mobility prediction information message. For each distributed unit (DU) (e.g., DU_1 and DU_2), the message includes the cell identification (e.g., Cell_ID1 and Cell_ID2), the SSB_ID (e.g., SSB_ID1, SSB_ID2) within each cell, the beam identification (e.g., CSI-RS_ID1, CSI-RS_ID2) within each cell, the time of entering the cell, TRP (can be represented by SSB), or beam (e.g., TOE_c1, TOE_ssb1, TOE_csirs1), and the time of stay within each of the cells, SSBs, or beams (e.g., TOS_c1, TOX_ssb1, TOS_ssb2, TOS_csirs1, TOS_csirs2). The mobility prediction information message may also contain other parameters scheduled to apply during the stay in any particular cell, SSB, or beam. All of this information may be contained within one message thereby eliminating the need for the network to signal the UE with the parameters necessary for a particular cell, TRP, or beam every time the UE enters a new cell, TRP, or beam. This reduces network signaling overhead as compared to the conventional methods.

TABLE 1

| the structure and contents of the mobility prediction information message | | | | |
|---|---|---|---|---|
| Cells/TRPs/ Beams on the route within RNA | Time of Entering (ToE) | Time of Stay (ToS) | Other Parameters Scheduled to apply | ... |
| DU_1 Cell_ID1 | TOE_c1 | TOS_c1 | . | . |
| SSB_ID1 | TOE_ssb1 | TOS_ssb1 | . | . |
| SSB_ID2 | | TOS_ssb2 | . | . |
| CSI-RS_ID1 | TOE_csirs1 | TOS_csirs1 | | |
| CSI-RS_ID2 | | TOS_csirs2 | | |
| . | | | | |
| . | | | | |
| DU_2 Cell_ID2 | | TOS_c1 | . | . |
| SSB_ID1 | | TOS_ssb1 | . | . |
| SSB_1D2 | | TOS_ssb2 | . | . |
| CSI-RS_ID1 | | TOS_csirs1 | | |
| CSI-RS_ID2 | | TOS_csirs2 | | |
| . | | | | |
| . | | | | |

The network provided mobility prediction information allows both the UE and network to conduct pre-preparation. This can lead to significant signaling overhead reduction, delay reduction, and resource sharing.

FIG. 2 is a diagram of an embodiment of a system 200 for closed loop inactive UE location tracking. The system 200 includes a UE 202 and a DU 204. The bottom axes represents the real time location axis 208 and the predicted time location axis 206. The DU 204 has a plurality of TRP/beam coverage areas 210, 212, 214, 216, 218. In the depicted example, the location of the UE 202 in real time at 6:24 is in the TRP/beam coverage area 212. However, the predicted location of the UE 202 at time 6:24 is in TRP/beam coverage area 218. If this difference in location exceeds a threshold (e.g., in the depicted example, the threshold could be 3 beam coverage areas), then the UE 202 sends a location update message or a signal with predefined pattern 220 to the DU 204. The DU 204 then updates the mobility prediction information and transmits an updated mobility prediction information message 222 to the UE 202.

Beam resolution inactive UE 202 location tracking may monitor SSB first if available. The inactive UE 202 may periodically measure the neighboring beams (e.g., beams 210 and 214). The candidate beams can be determined based on the current time and predicted time/beam association provided in MobilityPredictionInformation message. If the offset is more than a threshold (e.g. more than two beam locations), a UE location update is triggered. In an aspect, the location update is a short message including only either the I-RNTI or the UE ID and the measured beam's ID. In another aspect, the location update is a light-SRS uniquely associated with the UE and allowing the network identify which beam covering the UE's location. In yet another aspect, the location update message is an SRS like UE location update can also be sent whenever a cell reselection occurs if needed.

In the case where the UE decides to change the route, the route change conducted in the application layer (e.g. a user changed the setting of the traveling route via the google map application) will trigger the UE to update the route change information to the network. The network can change the mobility prediction based on its own knowledge and send the updated mobility prediction information message to the UE.

Figure 3:
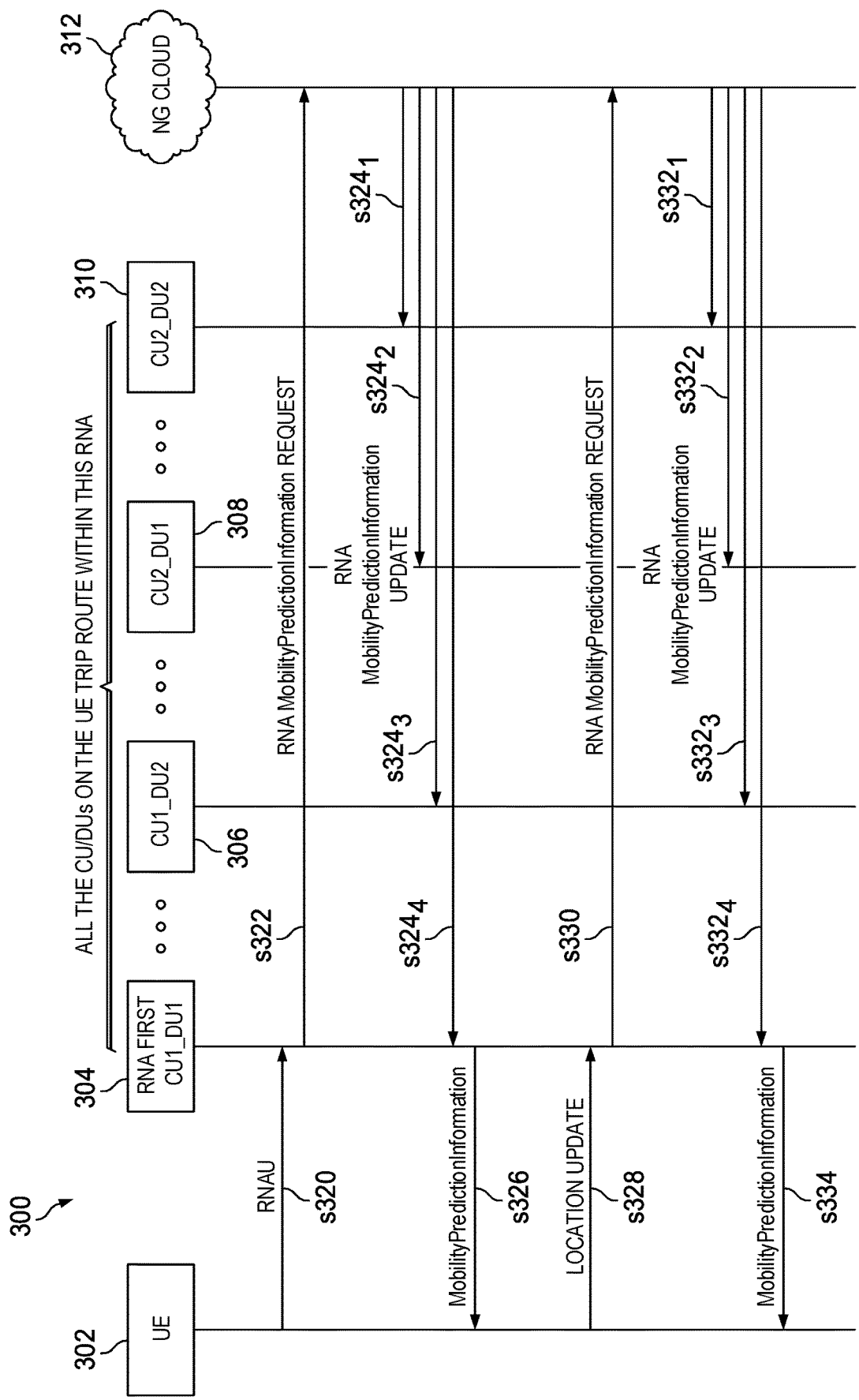
FIG. 3 is a signaling diagram of a method for the NG cloud to update the network nodes involved on the predicted route of the scheduled reservation of the resources.

FIG. 3 is a signaling diagram of a method 300 for the NG cloud to update the network nodes involved on the predicted route of the scheduled reservation of the resources. The method 300 includes messages exchanged between the UE 302, RNA of 1$^{st}$ CU1_DU1 304, CU1_DU2 306, CU2_DU1 308, CU2_DU2 310, and the NG cloud 312. The method begins at step s320 where the UE 302 sends an RNAU message to the RNA 1st CU1-DU1 304. This triggers the RNA 1st CU1-DU1 304 at step s322 to send an RNA mobility prediction information request message to the NG cloud 312. At steps s324, the NG cloud 312 sends RNA Mobility Prediction Information Update to each of the CU/DUS 304, 306, 308, 310 on the UE 302 trip route. At step s326, the CU1_DU1 304 sends a mobility prediction information message to the UE 302. The mobility prediction message may include information as discussed above. At step s328, the UE may send a location update message to the CU1_DU1 304. The location update message may be triggered by the UE's actual location differing from the predicted location at that time by more than a threshold amount as discussed above. At step s330, the CU1_DU1 sends an RNA mobility prediction information request to the NG cloud 312. At steps s332, the NG cloud 312 sends an RNA mobility prediction information update message to each of the CUs/DUs 304, 306, 308, 310 on the UE trip route. These messages may include message to CUs/DUs not previously included if the route has changed such that the UE 302 will traverse through CUs/DUs that were not previously on the predicted route. The messages also include message to the CUs/DUs was previously on the route but now is not on the route to notify them cancelling the previous reservation. Other CUs/DUs that are no longer on the UEs predicted route may not receive further update messages if they remain off of the predicted route. At step s334, the CU1-DU1 304 sends an updated mobility prediction information message to the UE 302.

Initial application layer route start or change can trigger the network sending mobility prediction information to the UE. An inactive UE RNAU message or location update indication can also trigger the network to update its prediction and send to the UE. The network can also initiate the mobility prediction update to the UE based on its own knowledge. The network (NG cloud) also send schedule and reservation update message to the nodes on the route whenever the mobility prediction update is taking place.

Method 300 allows more efficient UE/network interaction, and resource sharing.

Figure 4:
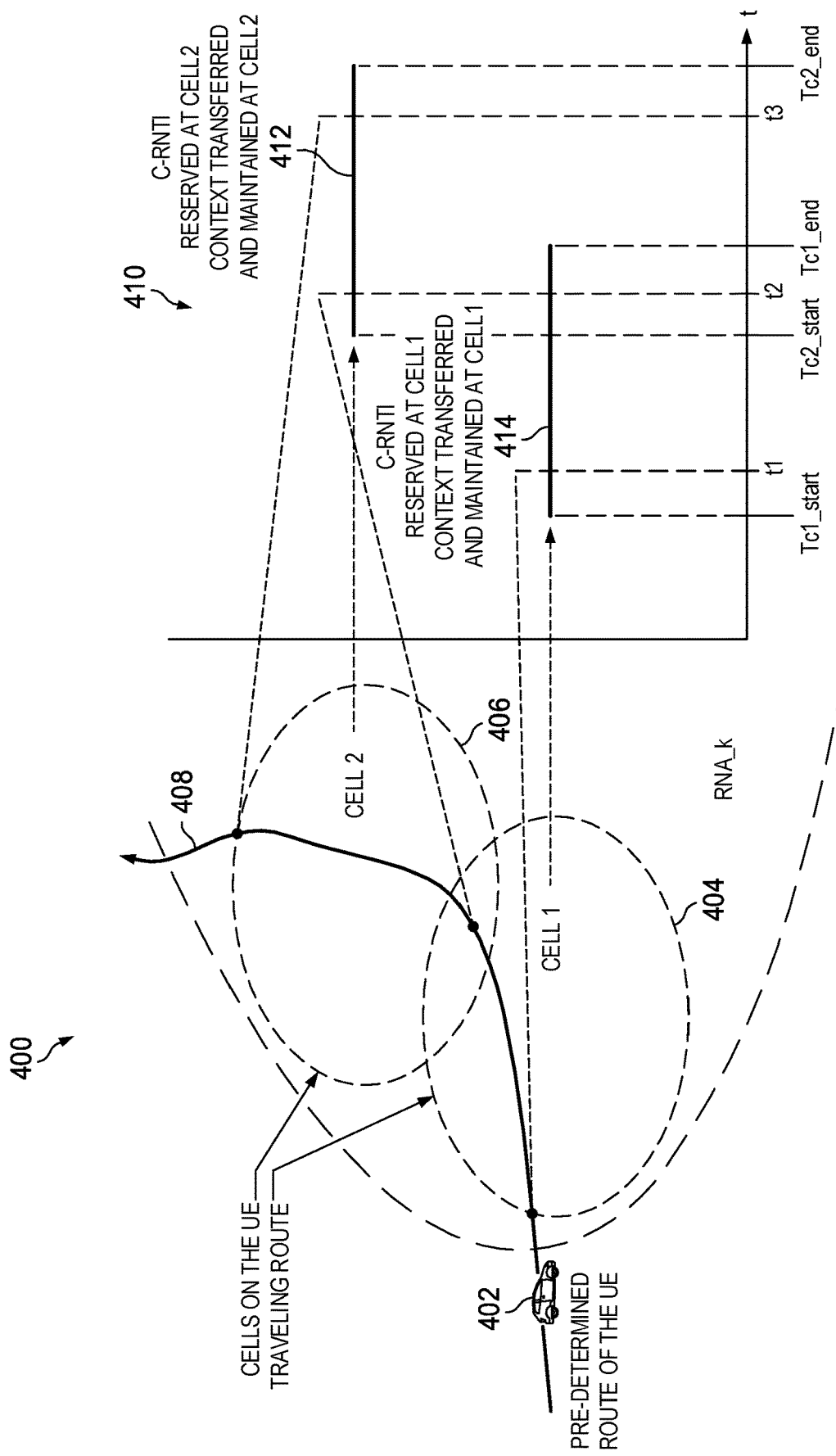
FIG. 4 is a diagram of a system for scheduled UE context maintenance and C-RNTI reservation.

FIG. 4 is a diagram of a system 400 for scheduled UE context maintenance and C-RNTI reservation. System 400 includes a UE 402 and two cells 404, 406. The UE 402 has a predicted route 408 that causes that UE to travel through cell 1 404 and cell 2 406. The predicted route has the UE 402 entering cell 1 404 at time t1 and exiting the cell 1404 at time t2. The predicted route 408 has the UE 402 entering cell 2 406 at time t2 and exiting cell 2 406 at time t3. The C-RNTI for UE 402 is reserved at cell 1 404 from time Tc1_start until time TC1_end. The context of UE 402 is transferred to and maintained at cell 1 404 during this time from Tc1_start until time TC1_end. The C-RNTI for UE 402 is reserved at cell 2 406 and the context transferred and maintained at cell 2 406 from time Tc2_start until time Tc2_end. The reserved time for the C-RNTI in each cell 404, 406 extends from before the predicted time the UE 402 will enter the cell 404, 406 to beyond the predicted time when the UE 402 will exit the cell 404, 406. This ensures that the C-RNTI is reserved and the context is maintained even if there is some error in the predicted location of the UE versus the actual location of the UE at a particular time. Outside of the reserved times, other UEs can be assigned the C-RNTI of the UE 402 in a particular cell 404, 406. Thus, the UE may keep its C-RNTI throughout its trip while the same C-RNTI may be reused for other UEs in a particular cell 404, 406 for times when the UE will not be in that cell 404, 406.

Based on the time prediction on UE's 402 stay at each cell 404, 406, C-RNTI (or I-RNTI/UE ID) reservation will be done by the network. The C-RNTI (or I-RNTI/UE ID) and reservation time are sent to each of the cell 404, 406 on the traveling route 408. During the reservation time, the cell 404, 406 will not assign this C-RNTI (or I-RNTI/UE ID) to other UEs. In other word, at other time this I-RNTI/UE ID or C-RNTI can be used by other UEs in this cell 404, 406. This allows the UE to keep its C-RNTI or I-RNTI/UE ID globally. With scheduled reservation at the cells 404, 406 on the route 408, Global C-RNTI or I-RNTI/UE ID are allowed now.

Based on the time prediction on UE's 402 stay at each cell 404, 406, the UE 402 context is pre-transferred to a cell 404, 406 and maintained there according to schedule. As mentioned above, there are some time overlap on the context and C-RNTI reserved at the two neighboring cells 404, 406 to allow for some inaccuracy of time/location prediction. In an aspect, a reservation timer can be used for controlling the start and release of the resources. When the timer expired, the locked resources for the context and C-RNTI will be released.

Figure 5:
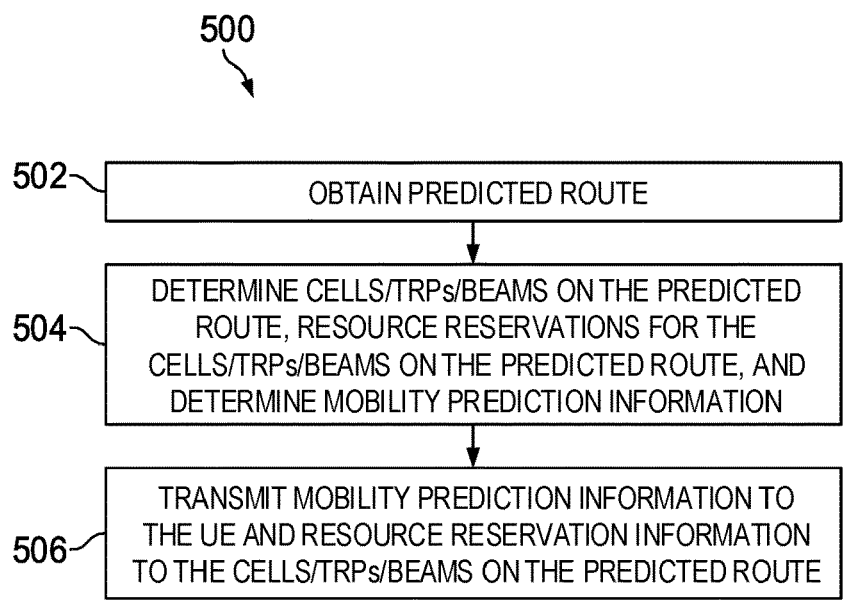
FIG. 5 is a flowchart of an embodiment of a method for pre-preparing a UE and nodes in a network according to a predicted route of the UE.

FIG. 5 is a flowchart of an embodiment of a method 500 for pre-preparing a UE and nodes in a network according to a predicted route of the UE. The method 500 begins at block 502 where a network node (e.g., a network controller, a TRP, a NG cloud, etc.) obtains a predicted route of the UE. The predicted route may be obtained from the UE or determined by the network node. The predicted route may be determined as discussed above. At block 504, the network node determines the cells/TRPs/beams on the predicted route, determines resource reservations for the cells/TRPs/beams on the predicted route, and determines mobility prediction information for the UE as discussed above. At block 506, the network node transmits the mobility prediction information to the UE and transmits the resource reservation information to the cells/TRPs/beams on the predicted rout. The network node may transmit this information to the UE via one or more intermediary network devices.

Figure 6:
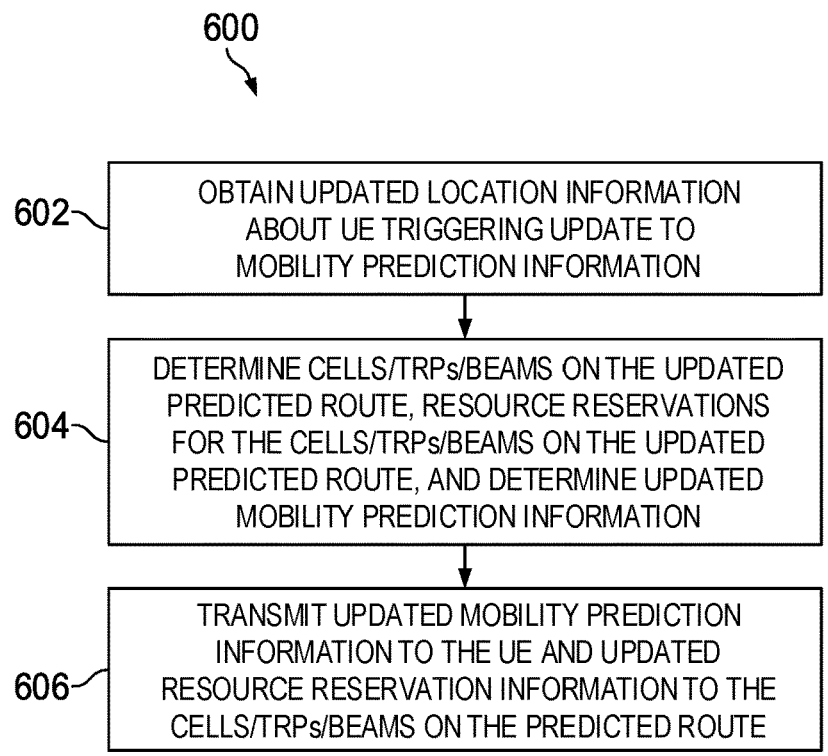
FIG. 6 is a flowchart of an embodiment of a method for updating mobility prediction information.

FIG. 6 is a flowchart of an embodiment of a method 600 for updating mobility prediction information. The method 600 begins at block 602 where the network node obtains updated location information about the UE that triggers an update to the mobility prediction information. The trigger may be receiving a location update from the UE, which in itself is triggered by the actual location differing from the predicted location by a threshold amount. Alternatively, the network node may have means of determining the actual location of the UE and triggers an update to the mobility prediction information if the network node determines that the actual location of the UE differs from the predicted location by a threshold amount. At block 604, the network node determines cells/TRPs/beams on the updated predicted route, determines resource reservations for the cells/TRPs/beams on the updated predicted route, and determines updated mobility prediction information for the UE for the updated predicted route. At block 606, the network node transmits the updated mobility prediction information to the UE and transmits the updated resource reservation information to the cells/TRPs/beams on the updated predicted route. The network node also transmits information to cells/TRPs/beams that are no longer on the predicted route releasing the reserved resources.

Figure 7:
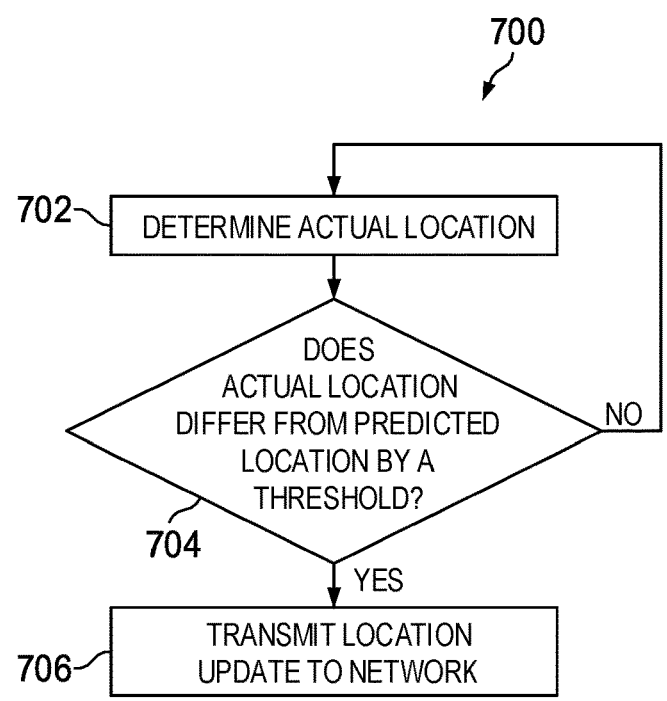
FIG. 7 is a flowchart of an embodiment of a method for triggering sending a location update from the UE to the network.

FIG. 7 is a flowchart of an embodiment of a method 700 for triggering sending a location update from the UE to the network. At block 702, the UE determines its actual location. This may be done by making measurements of beams or through other methods. At block 704, the UE determines whether the actual location differs from the predicted location by a threshold amount. The threshold may be expressed in terms of number of beams, number of cells, or in a distance (e.g., miles, feet, kilometers, etc.) or in a time difference according to the schedule. If, at block 704, the actual location does not differ from the predicted location by more than a threshold, the method 700 may return to block 702. If, at block 704, the actual location differs from the predicted location by more than a threshold, then the method 700 proceeds to block 706 where the UE transmits a location update to the network.

Figure 8:
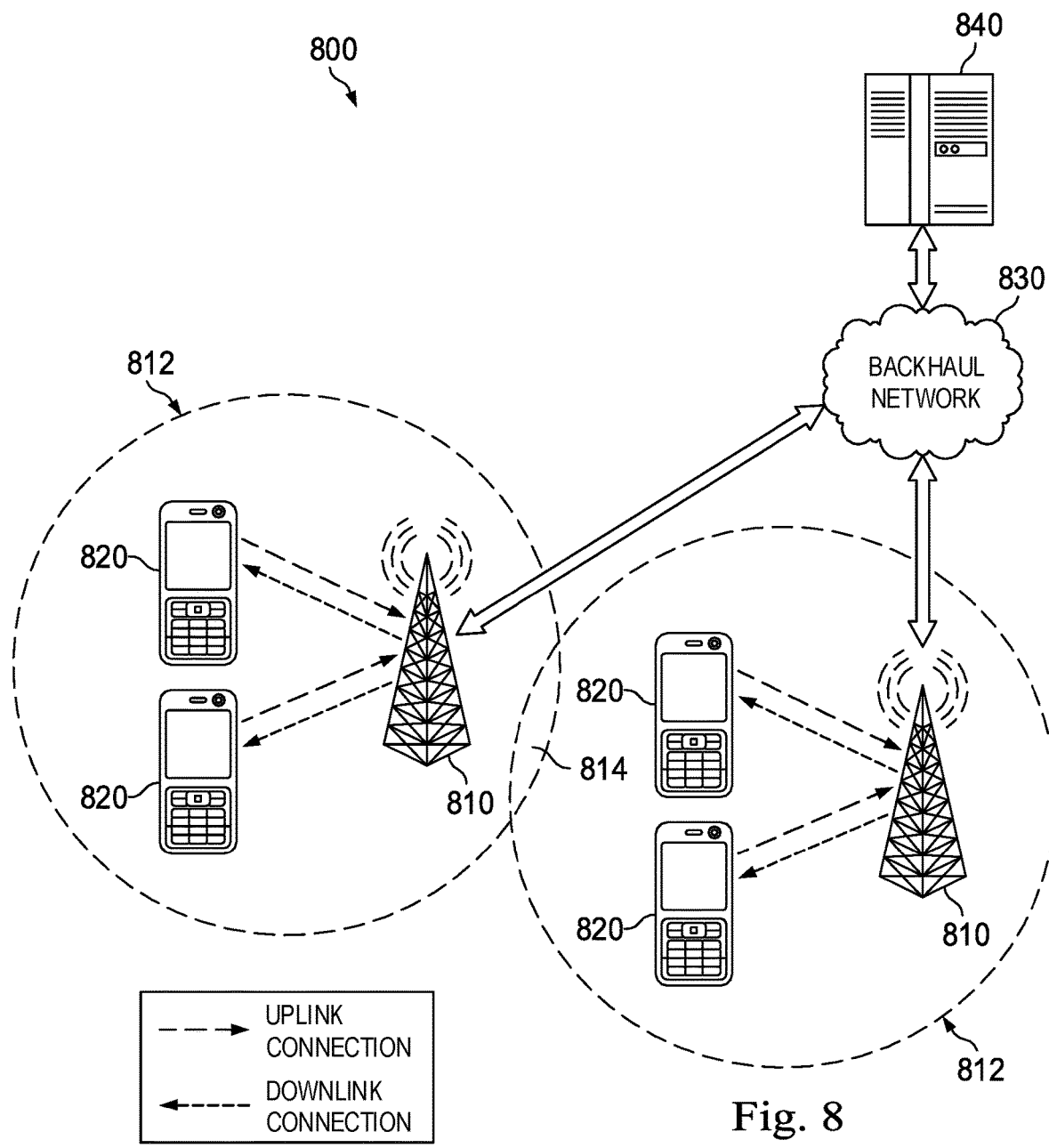
FIG. 8 illustrates a network for communicating data.

FIG. 8 illustrates a network 800 for communicating data. The network 800 comprises a plurality of access points (APs) 810 each having a coverage area 812, a plurality of user equipment (UEs) 820, a backhaul network 830, and a media server 840. As used herein, the term AP may also be referred to as a transmission point (TP), a base station (BS), a base transceiver station (BTS), an enhanced base station (eNB), or a next Generation Node B (gNB), and the terms may be used interchangeably throughout this disclosure. These coverage areas represent the range of each AP 810 to adequately transmit data, and the coverage areas of adjacent APs 810 may have some overlap 814 in order to accommodate handoffs between APs 810 whenever a UE 820 exits one coverage area 812 and enters an adjacent coverage area 812. The AP 810 may comprise any component capable of providing wireless access by, inter alia, establishing uplink (dashed line) and/or downlink (dotted line) connections with the UEs 820, such as a base transceiver station (BTS), an enhanced base station (eNB), a gNB, a femtocell, and other wirelessly enabled devices. The UEs 820 may comprise any component capable of establishing a wireless connection with the AP 810. For example, the UE 820 may be a smartphone, a laptop computer, a tablet computer, a wireless telephone, etc. The UEs 820 may also be referred to as wireless devices, mobile devices, or wireless mobile devices. The backhaul network 830 may be any component or collection of components that allow data to be exchanged between the AP 810 and a remote end (not shown). In some embodiments, the network 800 may comprise various other wireless devices, such as relays, femtocells, etc.

The media server APs 810 and UEs 820 may provide auxiliary content delivery to other UEs 820 or devices (not shown) according the systems and methods described herein. Network 800 is merely an example of a network in which the disclosed methods and systems may be implemented.

Figure 9:
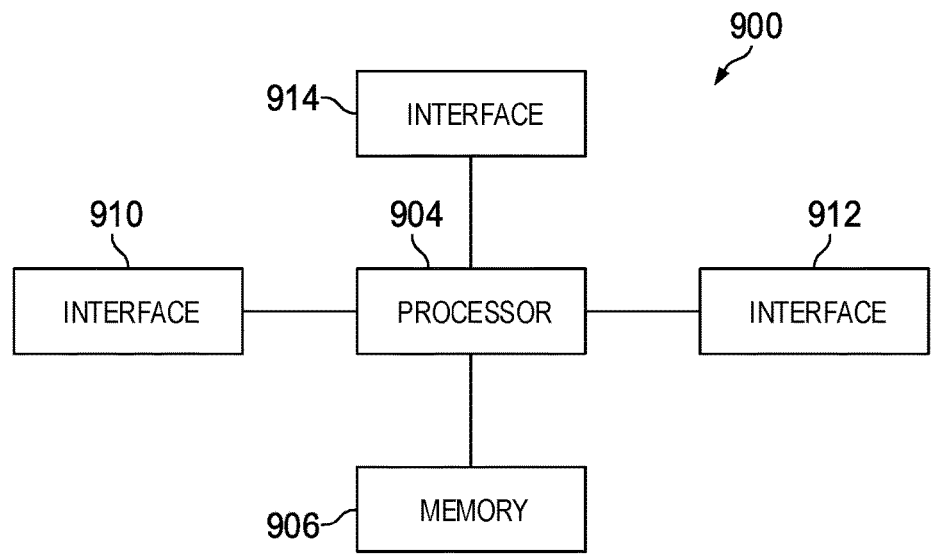
FIG. 9 illustrates a block diagram of an embodiment processing system for performing methods described herein, which may be installed in a host device.

FIG. 9 illustrates a block diagram of an embodiment processing system 900 for performing methods described herein, which may be installed in a host device. System 900 is an example of a UE. As shown, the processing system 900 includes a processor 904, a memory 906, and interfaces 910-914, which may (or may not) be arranged as shown in the figure. The processor 904 may be any component or collection of components adapted to perform computations and/or other processing related tasks, and the memory 906 may be any component or collection of components adapted to store programming and/or instructions for execution by the processor 904. In an embodiment, the memory 906 includes a non-transitory computer readable medium. The interfaces 910, 912, 914 may be any component or collection of components that allow the processing system 900 to communicate with other devices/components and/or a user. For example, one or more of the interfaces 910, 912, 914 may be adapted to communicate data, control, or management messages from the processor 904 to applications installed on the host device and/or a remote device. As another example, one or more of the interfaces 910, 912, 914 may be adapted to allow a user or user device (e.g., personal computer (PC), etc.) to interact/communicate with the processing system 900. The processing system 900 may include additional components not depicted in the figure, such as long term storage (e.g., non-volatile memory, etc.).

In some embodiments, the processing system 900 is included in a device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 910, 912, 914 connects the processing system 900 to a transceiver adapted to transmit and receive signaling over the telecommunications network.

Figure 10:
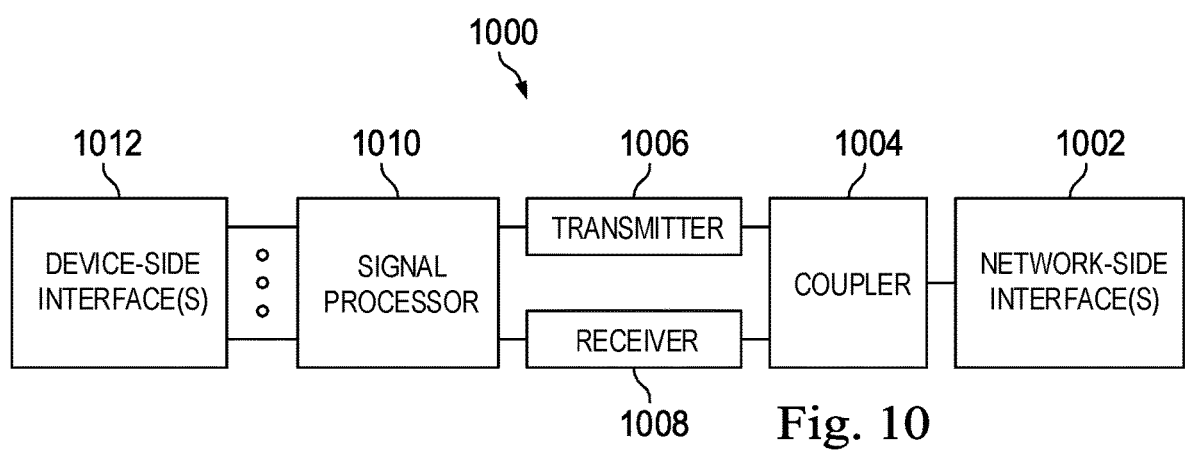
FIG. 10 illustrates a block diagram of a transceiver adapted to transmit and receive signaling over a telecommunications network.

FIG. 10 illustrates a block diagram of a transceiver 1000 adapted to transmit and receive signaling over a telecommunications network. The transceiver 1000 may be installed in a host device. The transceiver 1000 is an example of a network entity. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 1900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

In accordance with an embodiment of the present disclosure, a method for resource allocation in a wireless network includes obtaining, at a network device, a predicted route for a user equipment (UE). The method also includes determining, by the network entity, a predicted time of entering and a predicted duration of stay of the UE in each of a plurality of cells. Each of the plurality of cells includes a base station or gNB. The method also includes determining, by the network entity, mobility prediction information according to the predicted time of entering and the duration of stay of the UE in each of the plurality of cells. The method also includes transmitting, by the network entity, the mobility prediction information to the UE.

In accordance with an embodiment of the present disclosure, a network entity includes a non-transitory memory storage including instructions; and one or more processors in communication with the non-transitory memory storage. The one or more processors execute the instructions for obtaining, at the network entity, a predicted route for a user equipment (UE). The one or more processors also execute the instructions for determining, by the network entity, a predicted time of entering and a predicted duration of stay of the UE in each of a plurality of cells. Each of the plurality of cells includes a base station gNB. The one or more processors also execute the instructions for determining, by the network entity, mobility prediction information according to the predicted time of entering and the duration of stay of the UE in each of the plurality of cells. The one or more processors execute the instructions for transmitting, by the network entity, the mobility prediction information to the UE.

In accordance with an embodiment of the present disclosure, a network entity includes a receiver configured to obtain a predicted route for a user equipment (UE). The network entity also includes a predictor configured to determine a predicted time of entering and a predicted duration of stay of the UE in each of a plurality of cells. Each of the plurality of cells includes a base station gNB. The network component also includes a mobility prediction information generator configured to determine mobility prediction information according to the predicted time of entering and the duration of stay of the UE in each of the plurality of cells. The network component also includes a transmitter configured to transmit the mobility prediction information to the UE.

In an embodiment, a method in a user equipment (UE) for communicating in a network includes receiving, at the UE, a schedule of cell reselection for the UE in inactive mode and idle mode. The schedule of cell reselection includes a time of cell reselection and a cell identifier for each of a plurality of cells along a predicted route of the UE. The information can be used to compare with the real reselection time, if the offset is greater than a threshold, the UE will report to the network. The network dynamically adjust the schedule prediction. According to the received schedule, the UE applies the pre-received cell specific configuration parameters (e.g. the SSB and CSI-RS associated access or uplink transmission resources, and the TAs associated with each beam on the route in the cell) and take any pre-scheduled action accordingly, and to be prepared and ready for direct data transmission and receiving. The schedule of cell reselection is determined according to mobility prediction information. The method also includes attaching, by the UE, to a first cell from the plurality of cells at a time determined according to the schedule. The method also includes disconnecting, by the UE, from a second cell from the plurality of cells at the time determined according to the schedule. A timer is maintained in the UE to provide the timing of triggering the events following the received network predicted schedule.

In an embodiment, a user equipment (UE) includes a non-transitory memory storage comprising instructions and one or more processors in communication with the non-transitory memory storage, wherein the one or more processors execute the instructions. The instructions include instructions for receiving, at the UE, a schedule of cell reselection for the UE. The schedule of cell reselection includes a time of cell reselection and a cell identifier for each of a plurality of cells along a predicted route of the UE. The schedule of cell reselection is determined according to mobility prediction information. The instructions also include instructions for connecting, by the UE, to a first cell from the plurality of cells at a time determined according to the schedule. The instructions also include instructions for disconnecting, by the UE, from a second cell from the plurality of cells at the time determined according to the schedule. Some benefits for a UE to conduct the scheduled configuration include:
1. For a UE in connected mode, handover pre-preparation and RACH less access for the next target cell is allowed to minimize the handover latency on the mobility critical path and meet URLLC requirement during the mobility.
2. For a UE in inactive mode, the UE is allowed to use the pre-configured beam associated (associated with SSB or CSI-RS) UL resources according to the schedule to conduct access or RACH less access and direct data transmission.

In an embodiment, a method in a user equipment (UE) for communicating in a network includes receiving, at the UE, a mobility prediction information. The mobility prediction information includes a predicted time of entering each of a plurality of cells for the UE, a predicted duration of stay within each of the plurality of cells for the UE, and at least one configuration associated with at least one cell, transmit receive point (TRP), or beam in the plurality of cells for the UE. The predicted time of entering, the predicted duration of stay, and the configuration determined according to a predicted route of the UE. The predicted route includes predicted UE locations at corresponding predicted times. The method also includes configuring, by the UE, UE components to communicate with one of the plurality of cells at the predicted time of entering the one of the plurality of cells according to the mobility prediction information.

In an aspect, the method also includes reporting, by the UE, a time and location update when the a predicted time and location pair for the one of the cell, TRP, or beam differs from an actual time and location pair of the one of the cell, TRP, or beam is greater than a threshold, wherein the predicted time and location pair determined according to the mobility prediction information message.

In an embodiment, a method in a user equipment (UE) for communicating in a network includes receiving, at the UE, a mobility prediction information message. The mobility prediction information message includes a time of entering, a duration of stay within at least one cell, transmit receipt point (TRP), or beam, and at least one configuration associated with the at least one cell, TRP, or beam. The method also includes reporting, by the UE, a time and location update when the a predicted time and location pair for the one of the cell, TRP, or beam differs from an actual time and location pair of the one of the cell, TRP, or beam is greater than a threshold. The predicted time and location pair determined according to the mobility prediction information message.

A user equipment (UE) includes a non-transitory memory storage comprising instructions; and a route timer which is synchronized with the same one maintained at the network to trigger the scheduled events including applying corresponding configuration parameters at the right time and starting scheduled activities. The UE also includes one or more processors in communication with the non-transitory memory storage, wherein the one or more processors execute the instructions. The instructions include instructions for receiving a mobility prediction information message. The mobility prediction information message includes a time of entering, a duration of stay within at least one cell, transmit receipt point (TRP), or beam, and at least one configuration associated with the at least one cell, TRP, or beam. The instructions also include instructions for reporting a time and location update when the a predicted time and location pair for the one of the cell, TRP, or beam differs from an actual time and location pair of the one of the cell, TRP, or beam is greater than a threshold. The predicted time and location pair determined according to the mobility prediction information message.

In an embodiment, a network entity includes a first determining module configured to determine a predicted time of entering and a predicted duration of stay of a user equipment (UE) in each of a plurality of cells according to a predicted route of the UE. The predicted route includes predicted UE locations at corresponding predicted times. The network entity also includes a second determining module configured to determine mobility prediction information according to the predicted time of entering and the duration of stay of the UE in each of the plurality of cells. The network entity also includes a transmitter configured to transmit the mobility prediction information to the UE.

In an aspect, the first and second determining modules can implemented by a processor.

In an embodiment, an apparatus includes a receiver configured to receive mobility prediction information. The mobility prediction information includes a predicted time of entering each of a plurality of cells for the apparatus, a predicted duration of stay within each of the plurality of cells for the apparatus, and at least one configuration associated with at least one cell, transmit receive point (TRP), or beam in the plurality of cells for the apparatus. The predicted time of entering, the predicted duration of stay, and the configuration are determined according to a predicted route of the apparatus. The predicted route includes predicted apparatus locations at corresponding predicted times. The apparatus also includes a parameter configuration module configured to set parameters in apparatus components to facilitate communication with one of the plurality of cells at the predicted time of entering the one of the plurality of cells according to the mobility prediction information.

In an aspect, the parameter configuration module can implemented by a processor. Optionally, in any of the preceding aspects, the determining a predicted time of entering and a predicted duration of stay includes determining a first predicted time of entering of a first cell in the plurality of cells and determining a delta time of entering for the remainder of the plurality of cells, wherein the delta time of entering comprises a time difference with respect to the first predicted time of entering or a time difference with respect to a time of entering of a previous cell.

Optionally, in any of the preceding aspects, the method further includes determining a time of entering of each of a plurality of beams in each of the plurality of cells.

Optionally, in any of the preceding aspects, the method further includes determining a time of entering of each of a plurality of TRPs in each of the plurality of cells.

Optionally, in any of the preceding aspects, the mobility prediction information includes a time of cell reselection.

Optionally, in any of the preceding aspects, the mobility prediction information includes the predicted duration of stay of the UE in each of the plurality of cells.

Optionally, in any of the preceding aspects, the mobility prediction information includes the predicted duration of stay of the UE in each of the plurality of beams in each of the plurality of cells.

Optionally, in any of the preceding aspects, the mobility prediction information includes the predicted duration of stay of the UE in each of the plurality of TRPs in each of the plurality of cells.

Optionally, in any of the preceding aspects, the mobility prediction information includes at least one of a cell identification of each of the plurality of cells, an SSB_ID of each of the plurality of the wide beam of cells or TRPs. or a CSI-RS ID of each of the beams in each of the plurality of cells.

Optionally, in any of the preceding aspects, the mobility prediction information includes at least one of cell, TRP, and beam specific parameters corresponding to the cell, TRP, and beam at the associated time duration.

Optionally, in any of the preceding aspects, the mobility prediction information includes actions scheduled to take at each of the cells, and/or TRPs, and/or beams on the predicted route and at the predicted time duration. All above cells/TRPs/beams entering time and the time duration of stay included in the mobility prediction information message and delivered to the UE allows the UE to compare the predicted time and actual time at the current cell/TRP/beam coverage. The metrics for the offset can be other than the time difference (e.g. number of the beams from the predicted beam coverage, distance from the predicted location at this moment). If the difference is larger than a threshold, the UE report to the network and the network adjust the prediction. The UE notification to the network can be pre-defined signal pattern or uplink message. This forms a closed tracking loop to ensure the accuracy of the prediction.

Optionally, in any of the preceding aspects, the mobility prediction information includes cell, TRP or beam associated parameters or information. One example is the beam associated Uplink access or direct transmission resource. This information allows an inactive UE to conduct access or direct data transmission using the Uplink resources according to the schedule. To compensate the inaccuracy of the time-beam estimation, the UE can perform the Uplink transmission on the Uplink resources associated with multiple beams including the target beam and a few of its closet neighboring beams. This allows the inactive UE to conduct low latency access and direct data transmission and avoid the convention resume procedures before the data transmission. Another example of the information is the cell/TRP/beam associated Downlink monitoring occasions or opportunities. According to the scheduled pre-configuration, the inactive UE can monitor the paging occasions or direct data TX opportunities corresponding to the Cell/TRP/beam(s) on the route at current time.

Optionally, in any of the preceding aspects, the cell. TRP or beam associated parameters or information includes a default timing advance associated with each TRP or beam. This allows a UE using the right TA at the corresponding beam (location) to conduct RACH less access in normal mobility scenarios. This is impossible with conventional method.

Optionally, in any of the preceding aspects, the cell, TRP, or beam associated parameters or information includes control information to enable or disable a specified function at a corresponding cell, TRP, or beam at a specified time according to the predicted route. This allows the inactive UE change its behavior according to a pre-assigned schedule without the need that network to page the UE to wake it up first and then send the reconfigure message to the UE to change its behavior (e.g. change from the inactive to connected mode). This will significantly reduce the delay of the action and the signaling overhead. For example, during the period that the UE passing through certain commercial area, the UE can stop to receive the direct data transmission to the UE. Another example is the UE can change from inactive mode to the connected mode and vice versa according to the schedule.

Optionally, in any of the preceding aspects, the method further includes transmitting, by the network entity, scheduled reservations and scheduled actions to the gNBs on the predicted route, the scheduled reservations and scheduled actions determined according to the predicted time of entering and the predicted duration of stay of the UE in each of a plurality of cells on the predicted route.

Optionally, in any of the preceding aspects, the method further includes receiving, by the network entity, a location updated message or a location updated signal from the UE, when the UE determines that an actual location of the UE differs from a predicted location of the UE by a threshold value. The method also includes transmitting, by the network entity, updated mobility prediction information to the UE, the updated mobility prediction information determined according to the location updated message or the location updated signal.

Optionally, in any of the preceding aspects, the method further includes receiving, by the network entity, UE feedback. The method also includes determining, by the network entity, that an actual location of the UE differs from a predicted location by more than a threshold value determined according to the UE feedback. The method also includes transmitting, by the network entity, updated mobility prediction information to the UE. The preceding aspects allow a much more accurate estimation or prediction of the time and location of the UE. It will significantly reduce the load of paging and Downlink direct data transmission.

Optionally, in any of the preceding aspects, the method further includes transmitting, by the network entity, updated scheduled reservations and updated scheduled actions, or reservation cancellations to the gNBs on an updated predicted route, or not on the updated route but one the previously predicted route, the updated scheduled reservations, the updated scheduled actions, and the updated predicted route determined according to the location updated message, the location updated signal, or the UE feedback. This will allow the network resource saving while support the direct data transmission. For example, to support direct data transmission for both DL & UL, the context of the inactive UE will only be transferred to the cell and maintained there during the time the UE staying in the cell's coverage. After the UE left the cell, the context of the UE is released.

Optionally, in any of the preceding aspects, the method further includes assigning, by the network entity, a global Cell-Radio Network Temporary Identifier (C-RNTI) to the UE. The method also includes transmitting, by the network entity, a UE C-RNTI schedule of when the global C-RNTI is reserved to the UE in a specified cell to the gNB for the specified cell. The global C-RNTI is reused for a different UE in the specified cell outside the UE C-RNTI schedule.

Optionally, in any of the preceding aspects, the method further includes transferring, by the network entity, the context of the UE to the gNB of the specified cell following the same schedule of the C-RNTI reservation. The UE's context is released at the same time when the C-RNTI is released at the specified cell.

Optionally, in any of the preceding aspects, the network entity includes one of a network controller or one of the gNBs.

Optionally, in any of the preceding aspects, a network entity includes an assigner configured to assign a global cell-radio network temporary identifier (C-RNTI) to the UE, and wherein the transmitter is further configured to transmit a UE C-RNTI schedule of when the global C-RNTI is reserved to the UE in a specified cell to a gNB for the specified cell, wherein the global C-RNTI is reused for a different UE in the specified cell outside the UE C-RNTI schedule. The preceding aspects allow the UE using the same C-RNTI across different cells on its pre-determined route. The need of updating C-RNTI whenever entering a new cell is eliminated. C-RNTI is critical for UE to conduct PDCCH decoding and perform reference signal de-scrambling.

Optionally, in any of the preceding aspects, the method includes transmitting, by the UE, one of a location updated message and a location updated signal to a network entity when an actual location of the UE differs from a predicted location of the UE by a threshold value. The method also includes receiving, by the UE, an updated schedule of cell reselection, the updated schedule of cell reselection determined according to one of the location updated message and the location updated signal.

Optionally, a UE can use the pre-configured Uplink resources associated with a beam coverage that the UE is passing through following the schedule to perform the access or Uplink direct data transmission.

Optionally, a UE can use the pre-configured TA associated with the beam that the UE is passing through following the schedule to conduct RACH less access.

Optionally, an inactive UE can use the pre-scheduled configuration on Downlink monitoring direct data transmission opportunities and the paging occasions to monitor the direct data transmission and page message to the UE.

Optionally, in one or more of the preceding aspects, the configuration includes beam associated uplink (UL) transmission (TX) resources including UL random access occasions and direct data TX opportunities, UL timing advance (TA) for UL transmission, downlink (DL) paging occasions, and DL direct data monitoring opportunities.

Optionally, in one or more of the preceding aspects, the method also includes receiving, an updated mobility prediction information message.

Optionally, in one or more of the preceding aspects, the method also includes conducting UL access or direct data transmission with pre-configured uplink (UL) transmission (TX) resources in effect at current time duration according to the schedule in the mobility prediction information message.

Optionally, in one or more of the preceding aspects, the method also includes performing RACH less access and direct data transmission (TX) with pre-determined and scheduled TA corresponding to current time.

Optionally, in one or more of the preceding aspects, the method also includes monitoring, by the UE, opportunities to receive paging messages or DL direct TX data according to a scheduled pre-configuration of paging or direct TX opportunities determined according to the mobility prediction information message.

Optionally, in one or more of the preceding aspects, the method also includes changing, by the UE, UE behavior according to pre-configured scheduled instructions embedded in the mobility prediction information message.

Optionally, in one or more of the preceding aspects, the UE maintains the same C-RNTI on a pre-scheduled route across different cells on the pre-scheduled route.

Optionally, in one or more of the preceding aspects, mobility prediction information comprises at least one of the following: a cell identification of each of the plurality of cells, an SSB_ID of each of the plurality of cells or TRPs, and a CSI-RS ID of each of the beams in each of the plurality of cells.

Optionally, in one or more of the preceding aspects, the mobility prediction information comprises at least one of cell, TRP, and beam specific parameters.

Optionally, in one or more of the preceding aspects, the method also includes using the pre-configured Uplink resources associated with a beam coverage that the UE is passing through following the schedule to perform the access or Uplink direct data transmission.

Optionally, in one or more of the preceding aspects, the method also includes using the pre-configured TA associated with the coverage of the beam or the TRP at the time that the UE is passing through following the schedule to conduct RACH less access.

Optionally, in one or more of the preceding aspects, an inactive UE uses the pre-scheduled configuration on Downlink monitoring direct data transmission opportunities and the paging occasions to monitor the direct data transmission and page message to the UE.

In an embodiment, a network entity includes a non-transitory memory storage comprising instructions. The network entity also includes one or more processors in communication with the non-transitory memory storage. The one or more processors execute instructions for implementing any of the previous disclosed methods, embodiments, or aspects.

In an embodiment, an apparatus includes a non-transitory memory storage comprising instructions and a route timer which is synchronized with the same one maintained at the network to trigger the scheduled events including applying corresponding configuration parameters at the right time and starting scheduled activities. The apparatus also includes one or more processors in communication with the non-transitory memory storage. The one or more processors execute instructions for implementing any of the preceding methods, embodiments, or aspects.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments. A person of ordinary skill in the art may understand that all or a part of the steps of in the methods in the embodiments may be implemented by a program instructing relevant hardware. The program may be stored in a computer readable storage medium.

What is claimed is:

1. A method for communicating based on prediction and pre-preparation in a wireless network, comprising:
determining, by a network entity, a predicted time of entering and a predicted duration of stay of a user equipment (UE) in each cell of a plurality of cells according to a predicted route of the UE, the predicted route comprising predicted UE locations at corresponding predicted times;
determining, by the network entity, mobility prediction information according to the predicted time of entering and the predicted duration of stay of the UE in each cell of the plurality of cells; and
transmitting, by the network entity, the mobility prediction information to the UE.

2. The method of claim 1, wherein the determining the predicted time of entering and the predicted duration of stay comprises:
   determining a first predicted time of entering of a first cell in the plurality of cells; and
   determining a predicted elapsed time between entering the first cell in the plurality of cells and entering one of the remainder of the plurality of cells.

3. The method of claim 1, further comprising determining a time of entering of each beam of a plurality of beams in each cell of the plurality of cells or determining a time of entering of each transmit receive point (TRP) of a plurality of TRPs in each cell of the plurality of cells.

4. The method of claim 1, wherein the mobility prediction information comprises at least one of a cell identification of each cell of the plurality of cells, a synchronization signal block ID (SSB_ID) of each wide beam of a plurality of wide beams of cells or TRPs, or a channel state information-reference signal (CSI-RS) ID of each beam of a plurality of beams in each cell of the plurality of cells.

5. The method of claim 1, further comprising transmitting, by the network entity, scheduled reservations and scheduled actions to nodes on the predicted route, wherein the scheduled reservations and scheduled actions are determined according to the predicted time of entering and the predicted duration of stay of the UE in each cell of the plurality of cells on the predicted route.

6. The method of claim 1, further comprising:
   receiving, by the network entity, a location updated message or a location updated signal from the UE, when an actual location of the UE differs from a predicted location of the UE by a threshold value; and
   transmitting, by the network entity, updated mobility prediction information to the UE, wherein the updated mobility prediction information is determined according to the location updated message or the location updated signal.

7. The method of claim 1, further comprising:
   receiving, by the network entity, UE feedback, the UE feedback including time and location data for the UE;
   determining, by the network entity and according to the UE feedback, that an actual location of the UE differs from the predicted location by more than a threshold value; and
   transmitting, by the network entity, updated mobility prediction information to the UE.

8. The method of claim 1, further comprising:
   transmitting, by the network entity, a UE cell-radio network temporary identifier (C-RNTI) schedule when a global C-RNTI is reserved to the UE in a specified cell to a gNB of the specified cell; and
   transferring, by the network entity, context of the UE to the gNB of the specified cell following the UE C-RNTI schedule, wherein the context of the UE is released at the same time as when the C-RNTI is released at the specified cell.

9. A method in a user equipment (UE) for communicating in a network, comprising:
   receiving, at the UE, mobility prediction information, the mobility prediction information comprising a predicted time of entering each cell of a plurality of cells for the UE, a predicted duration of stay within each cell of the plurality of cells for the UE, and at least one configuration associated with at least one of a cell, a transmit receive point (TRP), or a beam in the plurality of cells for the UE, wherein the predicted time of entering, the predicted duration of stay, and the at least one configuration are determined according to a predicted route of the UE, the predicted route comprising predicted UE locations at corresponding predicted times; and
   setting, by the UE, parameters of UE components to facilitate communication with one of the plurality of cells at a corresponding predicted time of entering the one of the plurality of cells according to the mobility prediction information.

10. The method of claim 9, further comprising:
    reporting, by the UE, a time and location update when a predicted time and location pair for the at least one of the cell, the TRP, or the beam differs from an actual time and location pair of the at least one of the cell, the TRP, or the beam is greater than a threshold, wherein the predicted time and location pair is determined according to a mobility prediction information message.

11. The method of claim 9, wherein the at least one configuration comprises beam associated uplink (UL) transmission (TX) resources including UL random access occasions and direct data TX opportunities, UL timing advance (TA) for UL transmission, downlink (DL) paging occasions, and DL direct data monitoring opportunities.

12. The method of claim 9, further comprising:
    conducting UL access or direct data transmission with pre-configured UL TX resources in effect at current time duration according to a schedule in a mobility prediction information message.

13. The method of claim 9, further comprising:
    performing random-access channel RACH-less access and direct data TX with pre-determined and scheduled TA corresponding to current time.

14. The method of claim 9, further comprising:
    monitoring, by the UE, opportunities to receive paging messages or DL direct TX data according to a scheduled pre-configuration of paging or direct TX opportunities determined according to a mobility prediction information message.

15. The method of claim 9, further comprising:
    changing, by the UE, UE behavior according to pre-configured and scheduled instructions embedded in a mobility prediction information message.

16. The method of claim 9, wherein the UE maintains same cell-radio network temporary identifier (C-RNTI) on a pre-scheduled route across different cells on the pre-scheduled route.

17. An apparatus, comprising:
    a non-transitory memory storage comprising instructions; and
    one or more processors in communication with the non-transitory memory storage, wherein the instructions instruct the one or more processors to:
    receive mobility prediction information, the mobility prediction information comprising a predicted time of entering each cell of a plurality of cells for a user equipment (UE), a predicted duration of stay within each cell of the plurality of cells for the UE, and at least one configuration associated with at least one of a cell, a transmit receive point (TRP), or a beam in the plurality of cells for the UE, wherein the predicted time of entering, the predicted duration of stay, and the at least one configuration are determined according to a predicted route of the UE, the predicted route comprising predicted UE locations at corresponding predicted times; and
    set parameters of UE components to facilitate communication with one of the plurality of cells at a corresponding predicted time of entering the one of the plurality of cells according to the mobility prediction information.

18. The apparatus according to claim 17, wherein the instructions instruct the one or more processors to:
report a time and location update when a predicted time and location pair for the at least one of the cell, the TRP, or the beam differs from an actual time and location pair of the at least one of the cell, the TRP, or the beam is greater than a threshold, wherein the predicted time and location pair is determined according to a mobility prediction information message.

19. The apparatus according to claim 17, wherein the instructions instruct the one or more processors to:
conduct uplink (UL) access or direct data transmission with pre-configured UL transmission (TX) resources in effect at current time duration according to a schedule in a mobility prediction information message.

20. The apparatus according to claim 17, wherein the instructions instruct the one or more processors to:
perform random-access channel RACH-less access and direct data TX with pre-determined and scheduled TA corresponding to current time.

* * * * *

UNITED STATES PATENT AND TRADEMARK OFFICE
CERTIFICATE OF CORRECTION

PATENT NO. : 11,265,696 B2
APPLICATION NO. : 17/111731
DATED : March 1, 2022
INVENTOR(S) : Jialin Zou and Qinghai Zeng It is certified that error appears in the above-identified patent and that said Letters Patent is hereby corrected as shown below:

In the Specification

In Column 1, Line 8 (approx.), delete "PCT/CN2018/09265," and insert -- PCT/CN2018/090265 --.

In the Claims

In Column 28, Line 30, In Claim 13, delete "RACH-less" and insert -- (RACH)-less --.

In Column 29, Line 21, In Claim 20, delete "RACH-less" and insert -- (RACH)-less --.

Signed and Sealed this
Seventh Day of June, 2022

*Katherine Kelly Vidal*

Katherine Kelly Vidal
*Director of the United States Patent and Trademark Office*